(12) United States Patent
Motoyama

(10) Patent No.: US 7,058,719 B2
(45) Date of Patent: Jun. 6, 2006

(54) SYSTEM, COMPUTER PROGRAM PRODUCT AND METHOD FOR MANAGING AND CONTROLLING A LOCAL NETWORK OF ELECTRONIC DEVICES AND RELIABLY AND SECURELY ADDING AN ELECTRONIC DEVICE TO THE NETWORK

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 707 days.

(21) Appl. No.: 10/198,991

(22) Filed: Jul. 22, 2002

(65) Prior Publication Data

US 2004/0015575 A1  Jan. 22, 2004

(51) Int. Cl.
*G06F 15/16* (2006.01)
*G06F 15/177* (2006.01)
*G08C 17/00* (2006.01)
*H04Q 7/24* (2006.01)
*H04Q 7/20* (2006.01)

(52) U.S. Cl. .............. 709/228; 709/220; 370/311; 370/338; 455/433

(58) Field of Classification Search ........... 709/217, 709/228; 370/338; 455/433
See application file for complete search history.

(56) References Cited

U.S. PATENT DOCUMENTS

| | | | |
|---|---|---|---|
| 5,276,680 A * | 1/1994 | Messenger | 370/311 |
| 6,301,262 B1 | 10/2001 | Peterson | |
| 6,580,704 B1 * | 6/2003 | Wellig et al. | 370/338 |
| 2002/0120750 A1 | 8/2002 | Nidd | |
| 2002/0147819 A1 * | 10/2002 | Miyakoshi et al. | 709/228 |
| 2002/0196763 A1 * | 12/2002 | Reynolds et al. | 370/338 |
| 2003/0045287 A1 * | 3/2003 | Taniguchi | 455/433 |
| 2004/0003060 A1 * | 1/2004 | Asoh et al. | 709/220 |
| 2005/0249169 A1 * | 11/2005 | Fong | 370/338 |
| 2005/0265552 A1 * | 12/2005 | Olson et al. | 380/270 |

FOREIGN PATENT DOCUMENTS

| | | |
|---|---|---|
| WO | WO 02/01807 | 1/2002 |
| WO | WO 02/01836 | 1/2002 |

OTHER PUBLICATIONS

U.S. Appl. No. 09/921,707, filed Aug. 6, 2001, Pending.

* cited by examiner

*Primary Examiner*—Wen-Tai Lin
(74) *Attorney, Agent, or Firm*—Oblon, Spivak, McClelland, Maier & Neustadt, P.C.

(57) ABSTRACT

A system method and computer program product for setting up a wireless electronic device to join a wireless local area network (LAN). The method upon which the system and computer program product is based includes sending a setup request from the wireless electronic device to a control device, the setup request including a request to be added to the wireless LAN, and receiving at the wireless device a data package from the control device, the data package including network information necessary for the wireless device to join the wireless LAN. The network information are then executed at the wireless device to establish a wireless connection to an access point of the wireless LAN. The setup request may be sent at a low power to ensure that only the control device in close proximity can receive the request. After the wireless connection to the LAN is established, the wireless electronic device resumes full power communications.

40 Claims, 18 Drawing Sheets

SYSTEM, COMPUTER PROGRAM PRODUCT AND METHOD FOR MANAGING AND CONTROLLING A LOCAL NETWORK OF ELECTRONIC DEVICES AND RELIABLY AND SECURELY ADDING AN ELECTRONIC DEVICE TO THE NETWORK

CROSS-REFERENCE TO RELATED APPLICATION

The subject matter of previous application Ser. No. 09/921,707, filed on Aug. 6, 2001, is incorporated herein by reference.

BACKGROUND OF THE INVENTION

1. Field of the Invention

The present invention is directed to methods, computer-based systems and computer program products for managing and controlling devices, and in particular managing and controlling electronic devices on a local network.

2. Discussion of the Background

The past few decades have witnessed the ever-increasing pervasiveness of electronic and computer equipment in our work and home lives. From home entertainment systems to office equipment, the modem home and workplace includes a vast array of electronic devices. Moreover, traditional electrical devices such as refrigerators and ordinary lighting units have become sophisticated microprocessor controlled devices.

With such a large number of sophisticated electronic devices in our home and workplace, there has been recognized a need to manage such equipment. For example, the Open Services Gateway Initiative (OSGI) is an industry initiative to provide the technology to allow management of localized electronics equipment by use of an external service provider. The initiative contemplates a service provider, located on a wide area network such as the Internet, providing management services for the localized electronic devices through a "gateway" into the home or workplace that the devices are located in. However, given the current state of computer security, users may be unwilling to open control of fundamental necessities, such as security and climate control, to the control of a virtual entity on the Internet. Moreover, comprehensive control of one's electronic environment may require wiring many devices to a central computer which is expensive and restricts the mobility of the devices.

In addition to the need to manage the large number of sophisticated devices in the home or office, the diversity of such devices makes it difficult for users to manually control the settings of these devices. For example, while most microprocessor based devices are set up and manually controlled by way of a menu driven interface, the menu organization and terminology varies greatly among electronic devices. Indeed, one must spend a great deal of time reading setup and control instructions for each device in the home or workplace in order to optimize the features and conveniences of these device. This is both a burden and a bother to users.

In addition to the burden of learning the control features of each electronic device, many devices are not provided with a remote controller thereby requiring the user to input commands to each device locally. Those devices that do have remote control such as televisions, VCRs, and ceiling fans have traditionally used an infrared transceiver on the remote control device and the device to be controlled. However, such control devices require line of sight infrared communications which is not suitable for controlling wireless network devices that are scattered throughout various rooms of a household or office. Moreover, traditional remote control devices are often complex devices that include a large number of buttons associated with functional controls for the device to be controlled.

SUMMARY OF THE INVENTION

An object of the present invention is to provide a method, system, and computer readable medium for locally managing electronic devices in the home or workplace.

Another object of the present invention is to provide a method, system, and computer readable medium for manually controlling a wide variety of electronic devices in the home or workplace.

Yet another object of the present invention is to provide a method, system, and computer readable medium for remotely controlling electronic devices without the need for line of sight transmission between the controller and device controlled.

Still another object of the present invention is to provide a method system, and computer readable medium for reliably and securely adding a new network device to a desired wireless LAN in an environment where more than one wireless LAN exists. These and other objects of the present invention are achieved by a method, system and computer program product for setting up a wireless electronic device to join a wireless local area network (LAN). In a first aspect of the invention, the method upon which the system and computer readable medium is based includes sending a setup request from the wireless electronic device to a control device, the setup request including a request to be added to the wireless LAN, and receiving at the wireless device a data package from the control device, the data package including network information necessary for the wireless device to join the wireless LAN. The network information are then executed at the wireless device to establish a wireless connection to an access point of the wireless LAN.

In the first aspect of the invention, the sending step may include sending information identifying the wireless LAN that the wireless device is requesting to be added to, and sending information identifying the type of wireless device requesting to be added to the wireless LAN. In this embodiment, the receiving step includes receiving network protocol software operable on the wireless device identified and compatible with the LAN identified. In another embodiment of the first aspect, the sending step includes sending information requesting optional network services for the wireless device, and the receiving step includes receiving network information necessary to obtain the optional network services of the wireless LAN. The optional network services may include at least one of encryption and backup storage.

The setup request may be sent by either a hardwired or wireless medium. Where the setup request is sent by a wireless medium, the setup request is sent to the control device at a low power corresponding to a predetermined range of communication less than a full communication range of the wireless device. In this embodiment, the wireless electronic device communicates with the access point of the wireless LAN at the full communication range of the wireless device.

In a second aspect of the invention, the method upon which the system and computer readable medium is based includes receiving at the control device a setup request from the wireless electronic device, the setup request including a request to add the wireless electronic device to the wireless LAN. A data package is then created including network information necessary for the wireless electronic device to join the wireless LAN, and the data package is sent from the control device to the wireless electronic device.

The receiving step may include receiving information identifying the wireless LAN that the wireless electronic device is requesting to be added to, and receiving information identifying the type of wireless device requesting to be added to the wireless LAN. In this embodiment, the creating step includes creating a data package including network protocol software operable on the wireless electronic device identified and compatible with the LAN identified. In another embodiment of the second aspect, the receiving step includes receiving information requesting optional network services for the wireless device, and the sending step includes sending network information necessary to obtain the optional network services of the wireless LAN. In this embodiment the optional network services may include at least one of encryption and backup storage. The setup request may be received by either a hardwired or wireless medium.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
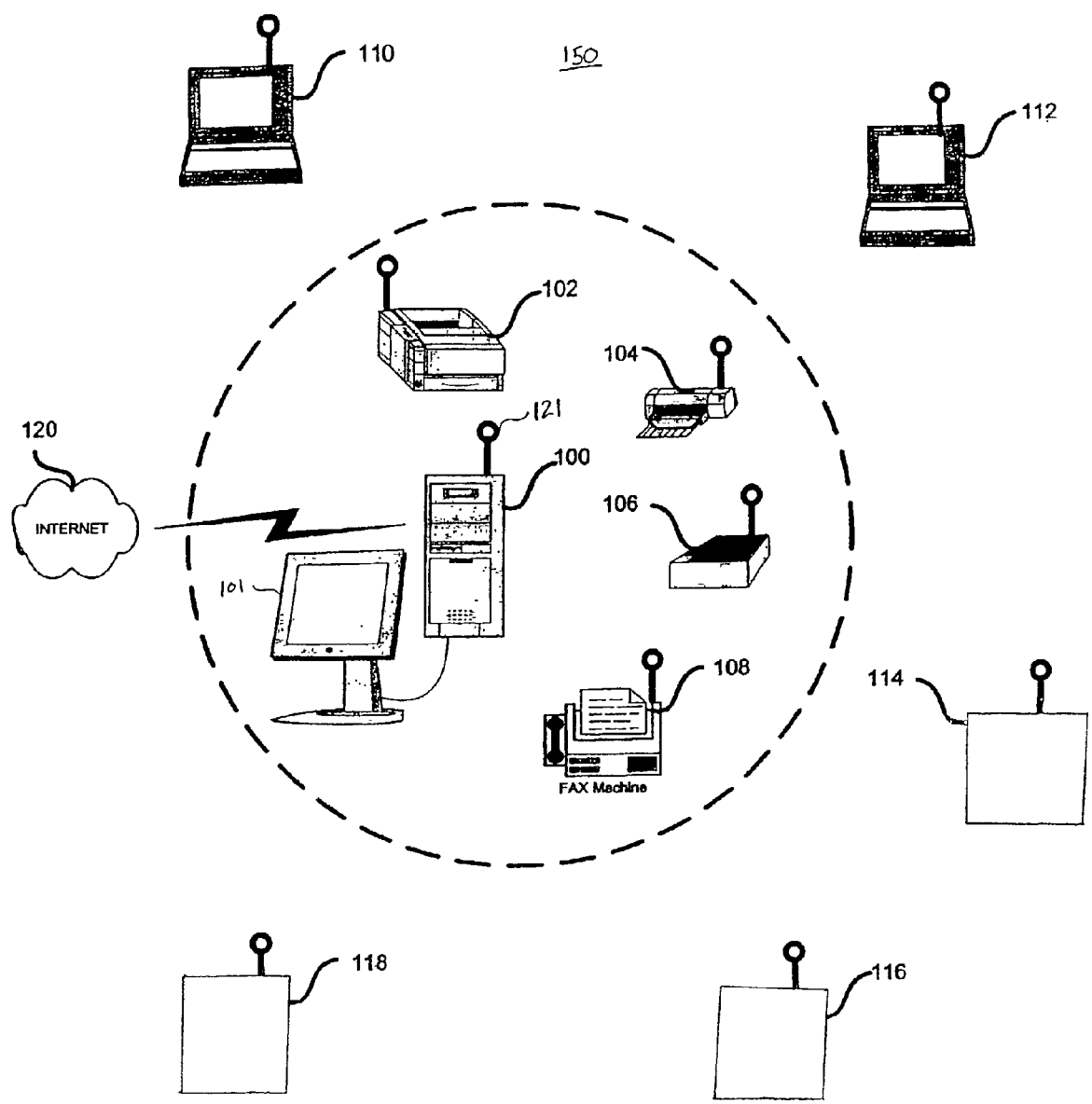
FIG. 1 is a system diagram illustrating a system for managing and controlling a local network of electronic devices in accordance with an embodiment of the present invention.

Referring now to the drawings, wherein like reference numerals designate identical or corresponding parts throughout the several views, FIG. 1 is a system diagram illustrating a system for managing and controlling a local network 150 of electronic devices. The system includes a main server 100 having a display 101, and office equipment including printers 102 and 104, scanner 106, and fax machine 108. The system also includes mobile terminals 110 and 112, entertainment device 114, appliance 116, and environmental control devices 118. As seen in FIG. 1, each of the devices 100–118 include an antenna represented by the symbol numbered as 121 on the main server 100. In addition, one or all of the devices 100–118 may be provided with access to the Internet 120 as will be further described below.

The main server 100 is any suitable workstation, desktop computer or other suitable network node for providing the management of computer and networking resources from a single point of administration. The main server includes a wireless transceiver device that allows the main server 100 to transfer files and other data to the other wireless electronic equipment 102–118 by way of antenna 121. Thus, the main server 100 provides a server function in a wireless local area network (LAN) including the electronic equipment 102–118 of FIG. 1 as clients. The LAN may be a bus, hub, or any other network type and may contain a firewall (not shown). A firewall is a hardware device or software that allows only authorized computers on one side of the firewall to connect to a network or computer on the other side of the firewall. Firewalls are known and commercially available devices or software (e.g., SunScreen and Firewall 1 from Sun Microsystems, Inc.).

Figure 18:
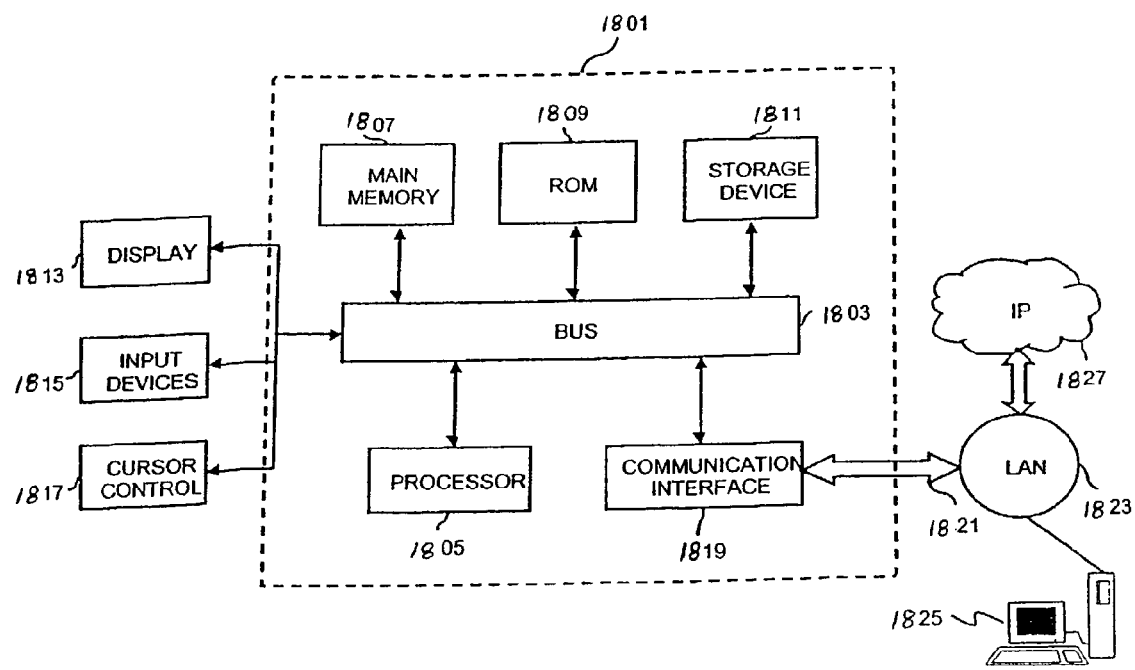
FIG. 18 illustrates a general purpose computer system upon which an embodiment according to the present invention may be implemented.

The main server 100 may be implemented using a general purpose computer, such as the computer of FIG. 18, that includes network operating system (NOS) software such as windows NT, Unix, Linux, or Novell Netware. The main server 100 may include a login server application such as Novell Directory Services ("NDS"), which is a product for managing access to computer networks. Using NDS, a network administrator can set up and control a database of users and manage them using a directory with a graphical user interface. Using NDS, or the main server 100, users of computers and other devices at remote locations can be added, updated, and managed centrally. The login operation to the network is typically controlled by a script, which is executed or interpreted. As an alternative to Novell Directory Services, Microsoft's Active Directory may be utilized as a directory service. Moreover, any suitable software and/or hardware may be utilized to assist in controlling access to and management of the network resources.

The main server 100 may also include file server, e-mail server, and Internet server applications if desired. The filer server application allows files contained on the main server 100 to be accessed by devices 102–118. The email server may be utilized to manage and control email accounts on the network and permit the sending and receiving of Internet email via Internet 120. The Internet server allows access to the Internet 120. If desired, the Internet server may be utilized to allow browsing of the World Wide Web, can allow file transfers using the File Transfer Protocol, and may allow the transmission and receipt of Internet electronic mail messages from suitable network nodes such as the mobile terminals 110 and 112.

In addition to the server applications described above, the main server 100 includes management and control applications for managing and controlling each of the devices connected to the main server 100, and in particular the entertainment device 114, the appliance 116, and the environmental device 118. For example, the main server 100 may include software for automatically controlling a thermostat or for providing a uniform means of manually controlling each of the electronic devices on the wireless LAN 150 as will be further described below.

The office equipment of the LAN 150 is signified by the dashed circle in FIG. 1 and provides all of the functions of conventional equipment that may be associated with a home or workplace office. For example, printers 102 and 104 may be implemented as an impact or non-impact printing device for printing text and images on a printing medium. Similarly, scanner 106 and fax machine 108 may provide conventional optical scanning and facsimile transmission functions respectfully. Despite these conventional functions, the printers 102 and 104, the scanner 106, and the fax machine 108 of the present invention are provided with a wireless transceiver suitable for communicating with the main server 100 via their respective antennas. In this regard, special server applications such as a print server may be provided on the main server 100 to allow all terminals on the network to share the printers 102 and 104, and office equipment in general.

Mobile terminals 110 and 112 function as mobile computer terminals having a transceiver that allows wireless access to the main server 100. The terminals are preferably dumb terminals having only the minimum hardware needed to access the main server 100, but may be thin or fat clients having the local hardware devices needed for independent operation, depending on the user needs. Thus, each mobile terminal 110 and 112 utilizes the resources of the main terminal 100. For example, either of the terminals 110 and 112 can use the printer 102, printer 104, scanner 106, or fax machine 108. Similarly, the terminals 110 and 112 can access files and software applications stored on the local storage of the main server 100. Since the terminals have wireless access and share the resources of the main server 100, they can be easily moved to any location that is within the area of coverage of the wireless LAN 150. In a preferred embodiment, this area of coverage can be adjusted to a desired size as will be further described below.

Entertainment device 114 may be any one of a variety of electronic devices used for providing entertainment to a user. For example, entertainment device 114 may be a television, stereo, video game, video cassette recorder (VCR), digital video disk (DVD) player, compact disk (CD) player or any other electronic device for entertaining the user. While the functionality of these devices is well known in the art, the entertainment device 114 of the present invention is provided with a transceiver suitable for allowing wireless communication with the main server 100 by way of antenna 121. Thus, entertainment device 114 is connected to the wireless LAN 150. In one embodiment of the present invention, the main server 100 contains software for managing and controlling the entertainment device as will be described below.

Appliance 116 represents an electronic device for performing some physical work for the user of the appliance. The appliance 116 may be a dishwasher, coffee maker, refrigerator, a clothes washer or dryer, or any other similar device. The appliance 116 is also equipped with a transceiver for providing wireless communication with the main server 100 via antenna 121 and is therefore connected to LAN 150. As with the entertainment device 114, the appliance 116 may be managed and controlled by the main server 100.

Environmental control device 118 represents those electronic devices found in the home or workplace, which control the environment of such areas. For example, environmental control device 118 may be a thermostat for controlling the heat and air conditioning of a home or building, a lighting unit, a ceiling fan, an attic fan or other exhaust unit, a humidity control unit, or similar device. As with the other devices in FIG. 1, the environmental control unit 118 is provided with a transceiver for allowing wireless communication via antenna 121 and in therefore connected to wireless LAN 150.

As noted above, the coverage area of the wireless LAN 150 may be set to a predetermined range. Specifically, in a preferred embodiment, the transceiver of the main server 100 includes an adjustable signal strength feature. By adjusting the output power of the main server 100, a user controls the range at which the network nodes (i.e. the electronic devices) can be placed and still be able to communicate with the main server 100 to maintain a network connection and share the resources of the main server 100. In this regard, the transceivers of electronic devices 102–118 may also include an adjustable transmit power feature. In a preferred embodiment, the electronic devices 102–118 have an automatic adjustment feature that adjusts the transmit power based on a detected signal strength of signals transmitted from the main server 100. Any known method or device for detecting signal strength may be used to implement this feature of the present invention.

Figure 2:
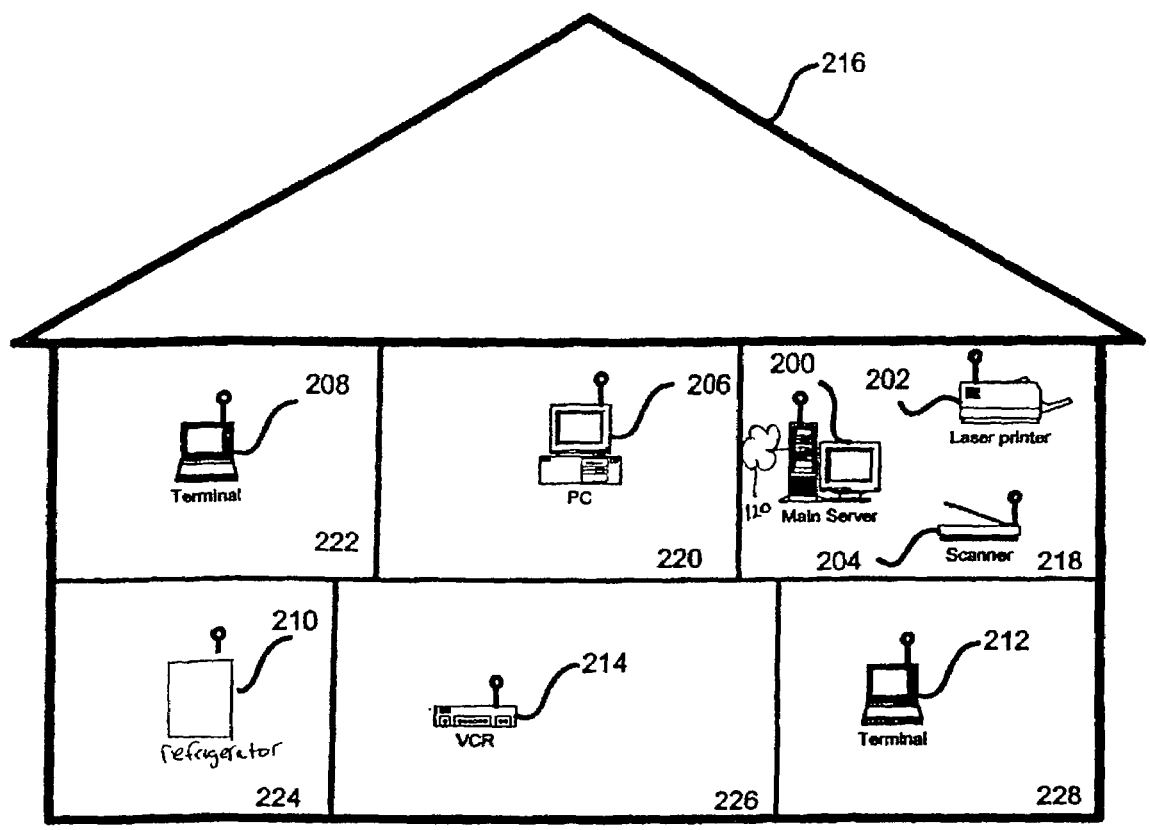
FIG. 2 is an illustration of the wireless LAN of the present invention implemented in a home environment.

As mentioned, the wireless network of FIG. 1 may be applied to a home or workplace environment. FIG. 2 is an illustration of the wireless LAN of the present invention implemented in a home environment. As seen in this figure, home 216 includes rooms 218, 220, 222, 224, 226, and 228 separated by walls or other physical structures. Room 218 of the home 216 contains a main server 200, a laser printer 202, and a scanner 204 and, thus, may serve as a home office. The main server 200 is depicted as a desktop computer with limited portability, but may be implemented as any general purpose computer such as the computer of FIG. 18. Moreover, the main server 200 may be connected to the Internet 120. Room 220 includes a desktop computer 206, while rooms 222 and 228 include mobile terminals 208 and 212 respectively. As with the mobile terminals of FIG. 1, the mobile terminals 208 and 212 are preferably dumb terminals, which provide the light weight and small size desirable for increased portability. Room 224 includes refrigerator 210 and room 226 includes VCR 214.

As with the system of FIG. 1, the devices in FIG. 2 each include an antenna that allows connection of the respective electronic device to a wireless network controlled by server 200. Thus, while the laser printer 202 and the scanner 204 are shown in room 218, these devices may be placed in any other room in the home 216 and still maintain communication with the main server 200. Moreover, the transmit power of the wireless devices of FIG. 2 may be adjustable to control the range of coverage of the network. As each device of FIG. 2 is connected to a wireless LAN controlled by main server 200, each electronic device of FIG. 2 can share the resources of the main server 200. In addition, the main server 200 includes software for managing and controlling the electronic devices on the home wireless network of FIG. 2.

Figure 3:
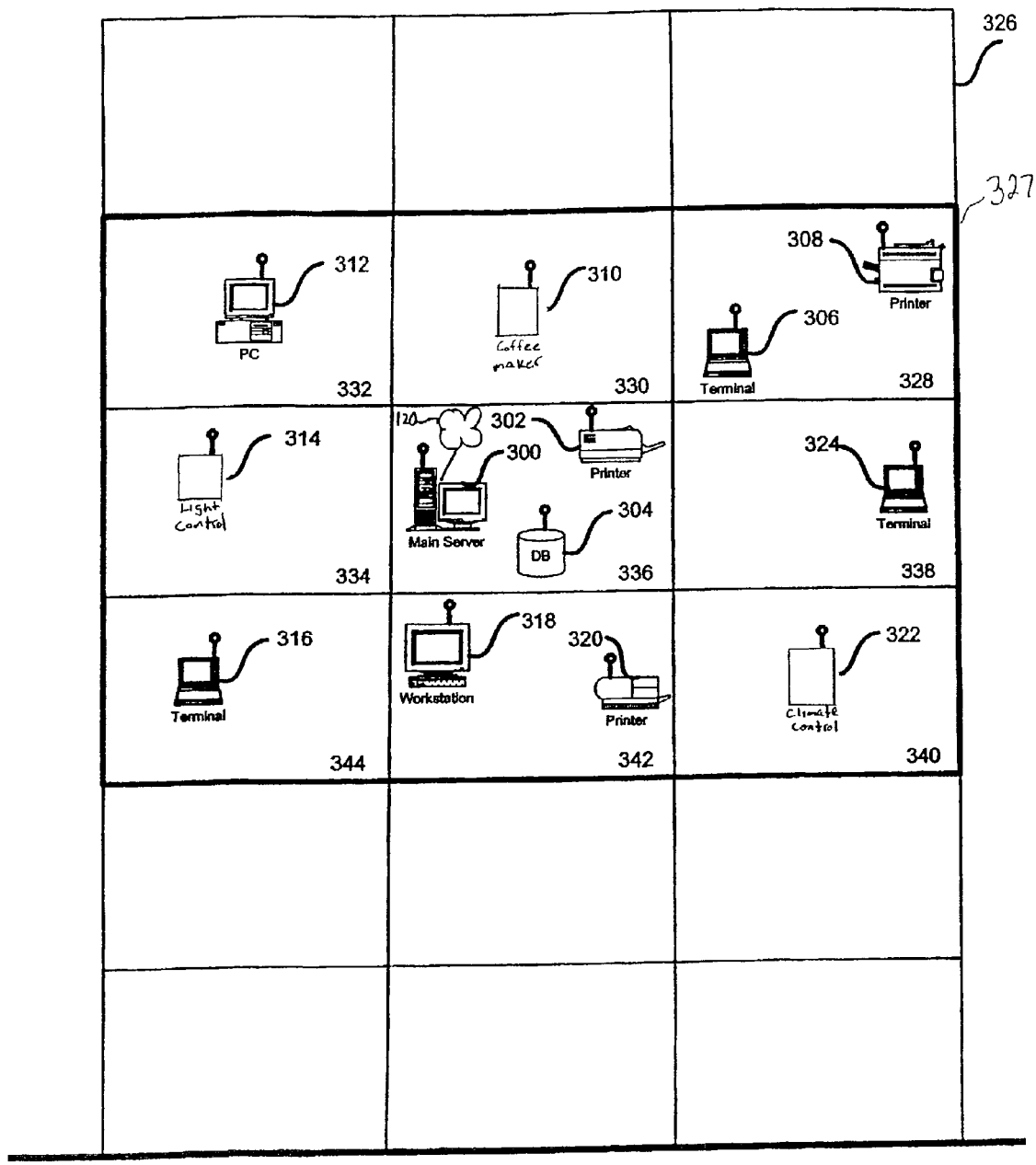
FIG. 3 is an illustration of the wireless LAN of the present invention implemented in a workplace environment.

FIG. 3 is an illustration of the wireless LAN of the present invention implemented in a workplace environment. The workplace 327 is in an office building 326 and includes rooms 328, 330, 332, 334, 336, 338, 340, 342, and 344 separated by a wall or other physical structure. Room 336 contains a main server 300, printer 302, and database 304 with main server 300 connected to Internet 120. The main server 300 and printer 302 are similar to their respective devices described in FIGS. 1 and 2. The database 304 is a file that contains records for carrying out the business of the workplace 327. Rooms 328, 338, and 344 include mobile terminals 306, 324, and 316 respectively, with room 328 also containing a printer 308. Room 332 includes a desktop computer 312 and room 342 includes a workstation 318 and printer 320. The workstation 318 is similar to the mobile terminals in that it depends largely on the hardware of the main terminal 300 for operation, however the workstation 318 may include a relatively large monitor suitable for displaying graphic and other special purpose software applications provided by the main server 300. Alternatively, the workstation 318 may be a powerful machine with disk and processing power interacting with the resources of the main server 300.

In addition to the office equipment described above, the workplace 327 also includes a coffee maker 310 in room 330, a lighting control unit 314 in room 334, and a climate control unit 322 in room 340. The coffee maker 310 is preferably provided with a timing device for brewing coffee at a predetermined time and includes a transceiver for communicating with the main server 300 via antenna 321. The lighting control device 314 is a unit for controlling the lighting of the workplace and also includes a timer for automatically activating the lighting at predetermined times. While the lighting control 314 is shown as a single unit located in room 334, it is to be understood that the lighting control can be implemented as a plurality of wireless units located on individual lights throughout the workplace 327. Finally, the climate control 322 is a wireless device that controls temperature and other environmental factors within the workplace. As with the lighting control, the climate control may be implemented as a plurality of wireless units located on individual environmental units throughout the workplace 327.

As seen in FIG. 3, only a portion of the rooms available in the office building 326 make up the workplace area for the wireless network. In one embodiment, the main server 300 emits an omnidirectional wireless communication signal and is therefore centrally located in the workplace so that the output power of the main server 300 covers an area substantially corresponding to the periphery of the workplace 327. In this regard, the transmit power of the main server 100 is preferably adjustable to cover a larger area of the building 326 should the workplace area be expanded. As previously described, the output power levels of the other (i.e. client) wireless electronic devices of FIG. 3 may also be adjustable.

It is to be understood that the system in FIGS. 1–3 are for exemplary purposes only, as many variations of the specific hardware and software used to implement the present invention will be readily apparent to one having ordinary skill in the art. For example, the functionality of the main server 100 may be divided among several computers. Moreover, while the systems are described as a client server network in which the main server 100 serves as the central server, the system may operate as a peer to peer network in which the mobile terminals and other desktop computers in the system act as both servers and clients to other nodes on the network. Finally, it is to be understood that the electronic devices connected to the LANs of FIGS. 1–3 are exemplary only and the present invention contemplates that any electronic devices may be connected to a LAN to realize the benefits and advantages of the present invention.

Figure 4:
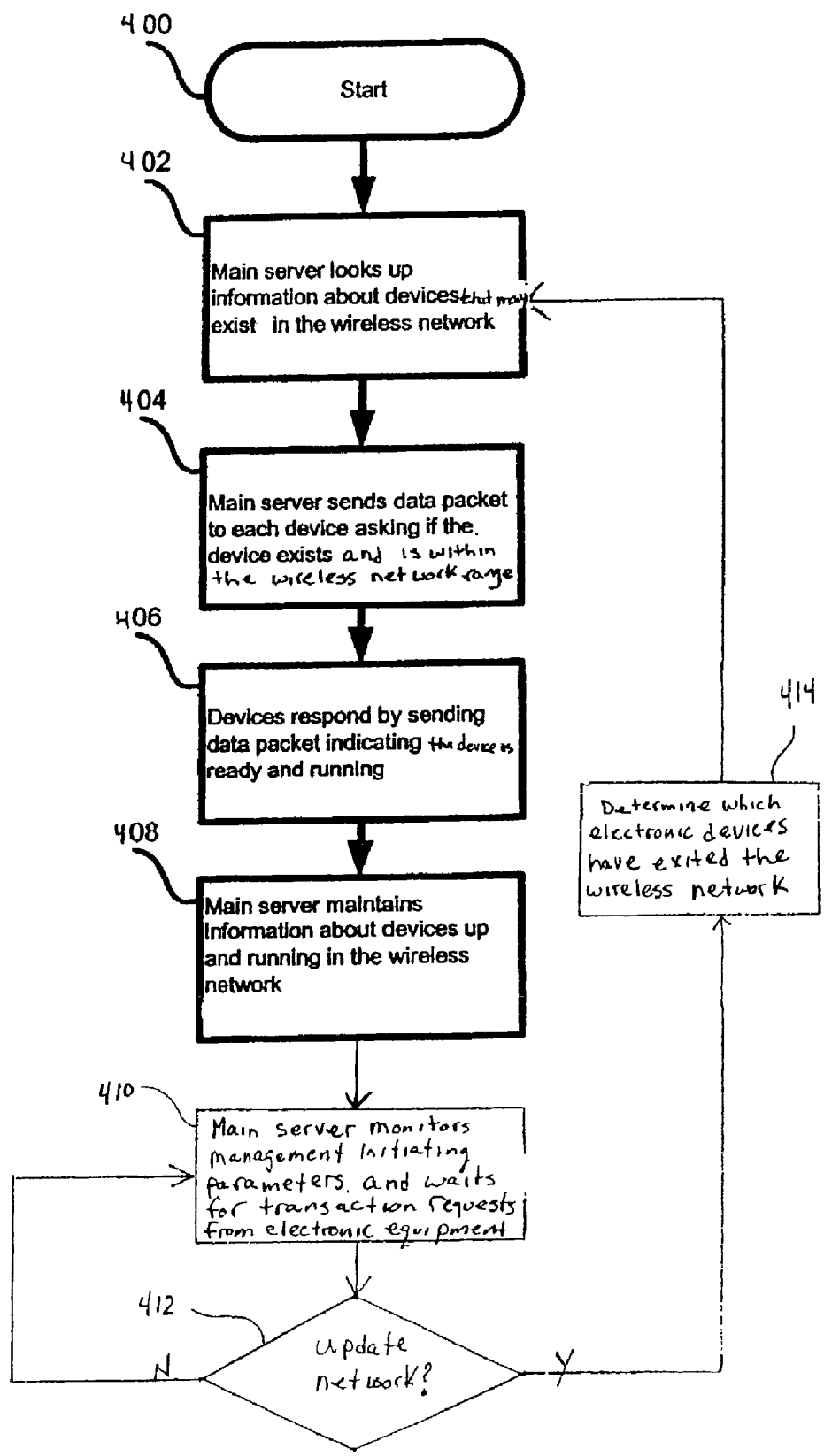
FIG. 4 is a flow chart illustrating an exemplary start up of a main server to establish a wireless LAN in accordance with an embodiment of the present invention.

FIG. 4 shows the flow diagram of an exemplary start up of a main server and establishment of a wireless LAN in accordance with the present invention. The process steps of FIG. 4 will be described with respect to the wireless network 150 of FIG. 1. As discussed above, each of the electronic devices of FIG. 1 includes an antenna for wireless communication. Thus, for all of the steps of FIG. 3 in which the data packets are sent between the different devices, the data packets are sent wirelessly. The data packets may also be encrypted for secure transmission.

Step 400 illustrates the starting up of the system when a user turns on the main server 100. When the main server 100 is turned on, the main server must identify all of the electronic devices that are powered up and capable of connecting with the wireless LAN 150. In step 402, the main server 100 looks up information that it stores about all of the electronic devices that can exist in the wireless network 150. In one embodiment, the stored list is input by a user of the LAN 150 as wireless devices are added to the LAN. In step 404, the main server 100 sends data packets to each of the electronic devices identified in step 402 to determine which electronic devices actually exist in the range of the wireless network 150. The data packets of step 404 may, for example, include the unique identifiers accessed in step 402 so that each electronic device can determine that it is being contacted by the main server 100.

In step 406, each of the electronic devices that is powered up and within the range of the wireless network 150 responds to the request made by the main server 100 in step 406. Each electronic device sends data packets to the main server 100 that include data indicating that the device is up and running. Of course, only those electronic devices that are within the signal range of the main server 100 and which have sufficient output power to communicate with the main server 100 can send a reply to the main server 100. Once the main server 100 has information about the status of each electronic device and terminal, in step 408, the main server 100 maintains information about the electronic devices powered-up and running in the wireless LAN 150. Then in step 410, the main server 100 monitors management initiating parameters and waits for transaction requests from the electronic devices connected to the wireless LAN 150. The process of monitoring management initiating parameters and responding to transaction requests will be further described with respect to FIGS. 5 and 6 below.

In a preferred embodiment, the main server 100 periodically updates information on the electronic devices connected to the LAN 150. This updating is preferably performed at predetermined time intervals, but may be triggered by some event other than timing. Thus, decision block 412 determines whether the network 150 is to be updated. If the main server 100 is not triggered to update the network, then the main server 100 returns to step 410 where it continues to monitor electronic equipment and wait for transaction requests. If the network is to be updated, the main server 100 proceeds to step 414 and then returns to step 402 as shown in FIG. 4.

In step 414, the main server 100 determines which electronic devices have exited the network and drops links to those devices. A device exits the network 150, for example, when power to the remote device is turned off or the device leaves the signal area of the local device. As used herein, the term "signal area" means that area in which the electronic device can receive, at a predetermined bit error rate, the transmitted signal from the main server 100 and in which the main server 100 can receive the transmit power of the remote device. A determination of whether an electronic device has left the network may be made by the main server 100 monitoring synchronization information of the electronic device, or by the main server 100 receiving an exit message transmitted from an electronic device prior to that device exiting the network. Moreover, as indicated above, the main server 100 may monitor signal strength of remote electronic devices and determine that a particular device has exited the network if the signal strength for that devices drops below a predetermined threshold which may be programmable by the user of the main server 100. In any situation where a remote device has exited the network 150, the main server 100 terminates any link to that device. After dropping electronic devices that have exited the network, the main server 100 returns to steps 402–408 where the main server identifies new devices that may have entered the network area and maintains a list of such devices. An electronic device enters the network 150, for example, when power to the electronic device is on and the device is within the signal area of the main server 100.

Thus, FIG. 4 indicates a process for start up of a main server 100 and establishment of wireless network 150. This process may be performed by using a media access control (MAC) protocol. The MAC protocol is a protocol used on multiple access links to ensure that only one device has access to the shared link at any one time. The MAC protocol, in effect, allocates talking time to each device on the network. For example, the MAC protocol typically divides a single data frame into several time slots. Each device in the network transmits information in a particular time slot and listens in all other time slots of the frame. As each device has a fixed amount of bandwidth, that is, a fixed number of data bits which can be transmitter per second, under the MAC protocol, a fixed amount of data can be transmitted in the device's time slot. A common MAC protocol used for wireless bridges is the Carrier Sense Multiple Access with Collision Avoidance (CSMA/CA). Different MAC protocols may perform the steps of FIG. 4 in different ways. For example, in one embodiment of the present invention, the MAC protocol of the main server 100 updates the network by periodically causing the main server to transmit a "join message" requesting new electronic devices to join into the network. In another embodiment, the MAC protocol transmits a join message and establishes a new link only if prompted by a new remote electronic device to do so. In yet another embodiment, the main server 100 keeps a count of the number of remote electronic devices for which a network link has been established, and the MAC protocol transmits a join message only if the count does not exceed a maximum number. The maximum number may be based on the bandwidth limitations of the main server 100 or programmable by the user of the main server.

Examples of multiple access protocols may be found in the IEEE 802.11 standard, final draft approved Jun. 26, 1997, and the Blue tooth specification "Specification of the Blue Tooth System", V.1.0B, Dec. 1, 1999, core specification—Vol. 1, the entire contents of which are incorporated herein by reference. It is to be understood that the features and benefits of the present invention do not depend on a particular MAC protocol and any of the above named protocols or any other MAC protocol may be used to practice the present invention as will be understood to one of ordinary skill in the art.

Figure 5:
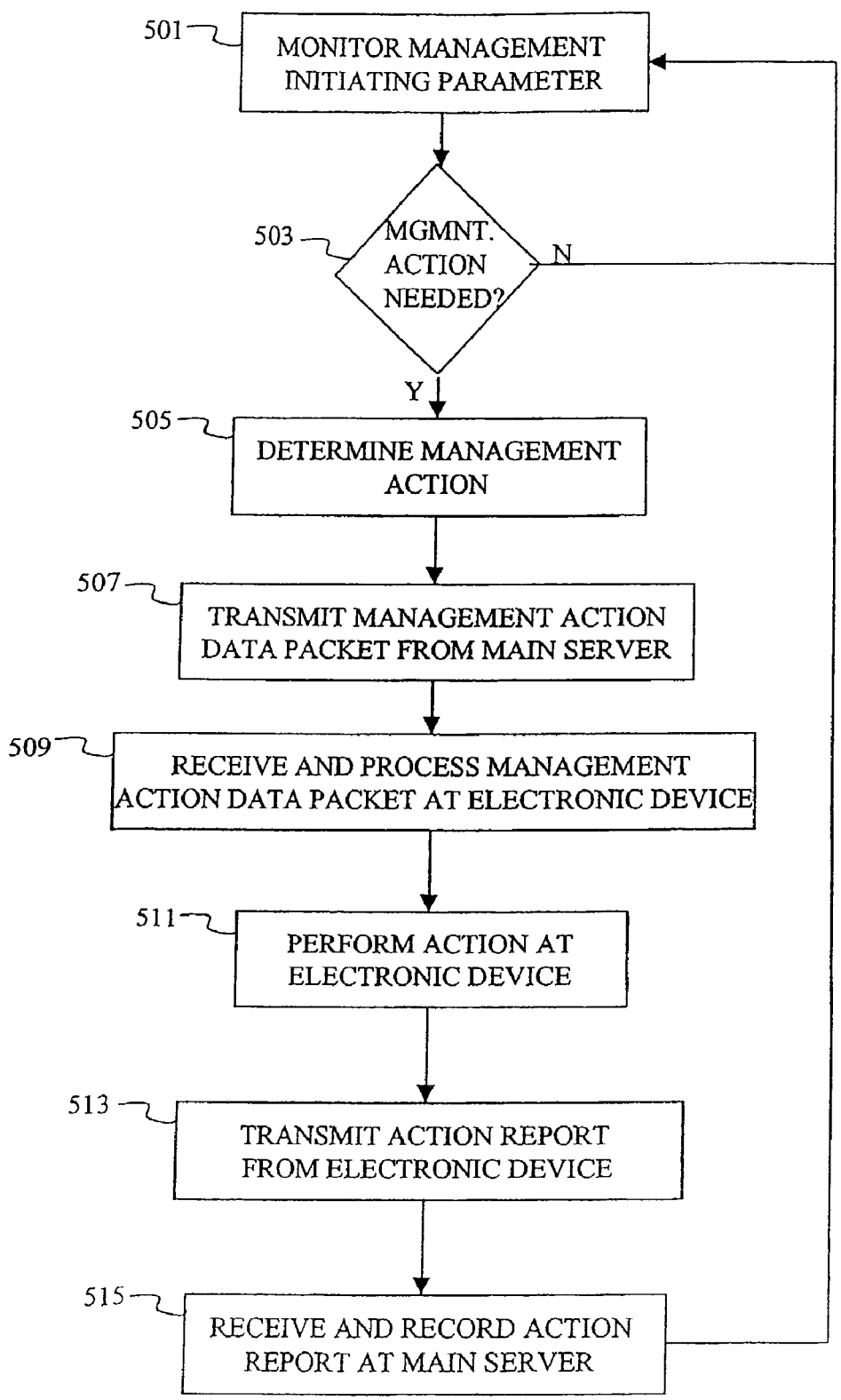
FIG. 5 is a flow chart illustrating a process for managing the electronic devices of a wireless home LAN according to one embodiment of the present invention.

As indicated in the discussion of step 410 of FIG. 4, a main server of the present invention monitors electronic equipment and waits for transaction requests from all electronic devices on the wireless network established by the main server. In a preferred embodiment, a main server manages electronic devices within a wireless home network such as the network described with regard to FIG. 2. FIG. 5 is a flow chart illustrating a process for managing the electronic devices of the wireless LAN in FIG. 2 according to one embodiment of the present invention.

In step 501, the main server 200 monitors the management initiating parameters of all electronic devices 202–212 connected to the wireless LAN. The management initiating parameter is a variable parameter that determines when a particular device will be managed or automatically controlled. For example, the management initiating parameter may be the time of a system clock, a counter that counts a time lapse, or sensor data indicating temperature, humidity, or some other measurable parameter. In decision block 503, the main server 200 determines whether the parameters monitored indicate that a management action is needed. Decision block 503 is performed by comparison of monitored parameters with at least one stored predetermined value for each management initiating parameter. For example, if the management initiating parameter is time, then the main server compares the actual time of an internal system clock with a stored time input by a user; where a match in these times exists, the main server 200 determines that some management action is needed.

If no parameter monitored indicates that an action is needed, the main server 200 returns to step 501 as shown in FIG. 5. If a management parameter indicates that a management action is needed, then the main server 200 proceeds to step 505 where the management action is determined. The management action is a predetermined action associated with the parameter monitored by the main server 200. For example, if the main server 200 is set up to turn on VCR 214 at 2:30 AM, the management parameter is the time of day and the management action is turning on the VCR 214. As another example, if the main server 200 is set up to monitor the battery power of mobile terminals 208 and 212 and send a message to all terminals indicating that a particular terminal battery must be charged, the management initiating parameter is the battery power and the action is sending a message to all terminals on the wireless network. Thus, a management initiating parameter and management action may be associated with any electronic device in the wireless network.

After the management action is determined, the main server 200 transmits a management action data packet including the management action information as shown in step 507. Returning to the VCR example above, the management action data packet would include the action "begin recording." In step 509, the electronic device to be managed receives and processes the management action data packet. In a preferred embodiment, the data packet also includes a unique identifier for the VCR 214 so that only this electronic device will receive and process the wireless data packet sent by the main server 200 in step 507.

In step 511, the electronic device controlled then performs the action of the management action data packet. That is, the VCR 214 will turn on the recording function at 2:30 AM. In most instances, the management action will be some action that the electronic device can automatically perform based on the management action data packet. However, it is to be understood that the present invention is not limited to automatic control. For example, the management action may be to display a reminder message on mobile terminals 208 and 212 reminding the user of wireless LAN 150 to clean out or change a water filter in refrigerator 210.

In a preferred embodiment, the electronic device that performs the management action will generate a management action report and send this report to the main server 200 as shown in step 513. The management action report is a data packet that includes information that the action was performed or was not performed by the electronic device due to some malfunction. In step 515, the report is received and stored in the main server 100 so a user can access and review the report. Once this report is received by the main server 200, the main server 200 again begins monitoring management initiating parameters of electronic devices on the wireless home network. Thus, FIG. 5 indicates the process steps for managing electronic devices on a wireless home network. While the process of FIG. 5 is described with respect to the home network of FIG. 2, it is to be understood that the process of the present invention may be performed on a workplace network of FIG. 3 or any other wireless network that includes a variety of electronic devices.

Figure 6:
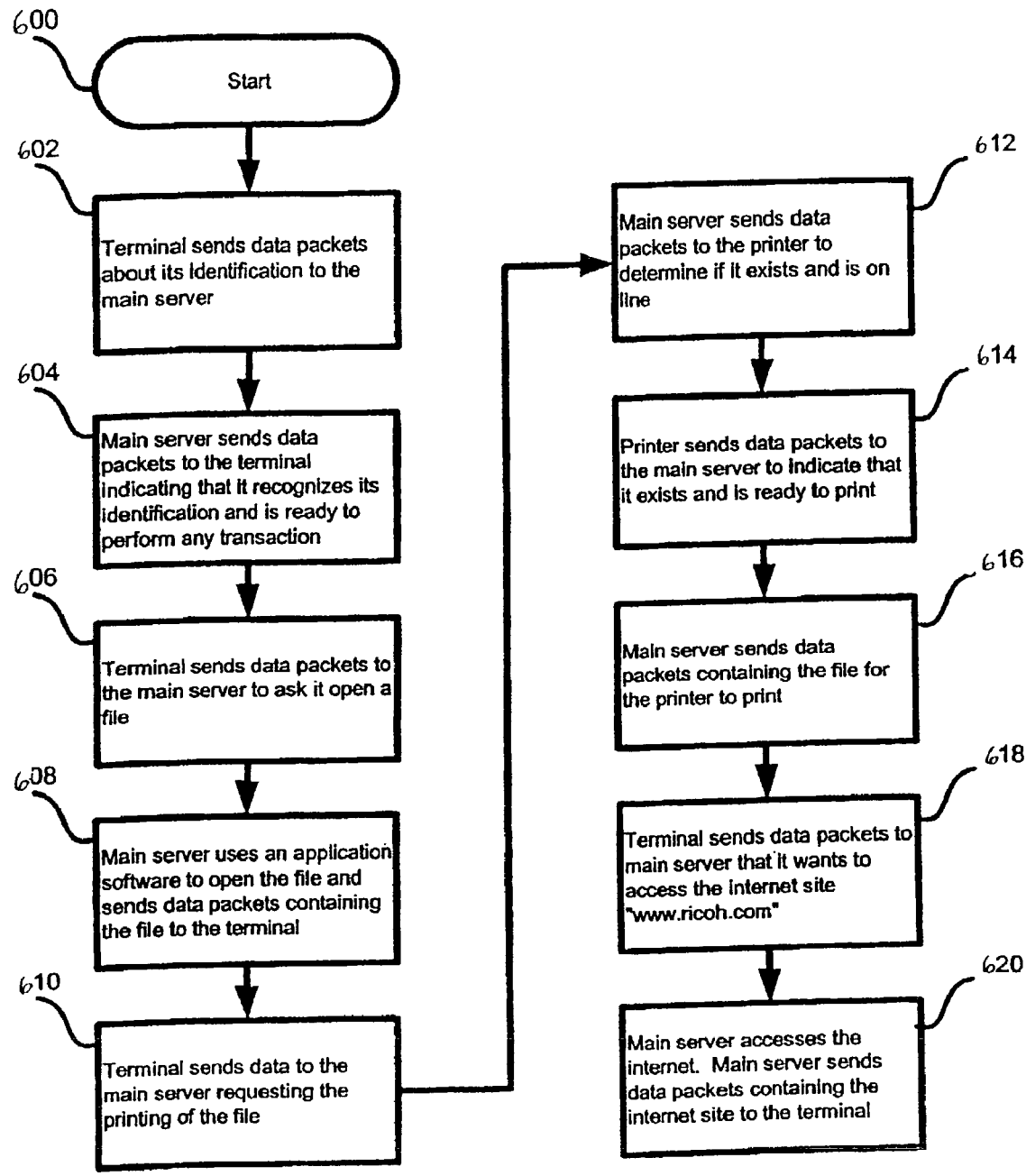
FIG. 6 is a flow chart illustrating a process of a mobile terminal accessing the resources of a main server in accordance with one embodiment of the present invention.

As previously noted, the wireless LAN system of the present invention not only provides management and control of the electrical devices connected to the LAN, but also allows for the sharing of resources of the main server. FIG. 6 is a flow chart illustrating a process of the mobile terminal 316 of FIG. 3 accessing the resources of the main server 300. As with the previously described process, all transfer of data packets between devices occurs by wireless transmission via respective antennas. As seen in FIG. 3, the main server 300 has wireless access to database 304 and a printer 308. Whenever the main server 300 needs the service of either database 304 or printer 308, the main server 300 will send wireless data packets with instruction and data on what the main server wants these electronic devices to do. By sending data packets to the main server 300, the terminal 306 may view data located in the database 304, use an application software in the main server 300, print a file on the printer 308, or access the Internet 120.

The process begins in step 600 when the user of mobile terminal 306 turns on the mobile terminal. This may be done by use of a power switch or by activating an input device of the mobile terminal to awake the terminal from a power saving or "sleep" mode. In step 602, the mobile terminal 306 sends data packets that identify the mobile terminal 306 to the main server 300 thereby indicating to the main server that the mobile terminal 306 is ready to use the resources of the main server 300. The main server 300 permits access only to those terminals that are registered to use the shared resources. This prevents unauthorized access to the main server 300 and its resources. As noted in the description of FIG. 4, the main server 300 waits for transaction requests from the terminal 306.

Once the main server 300 receives the identification data packets from the terminal and verifies that the identification is valid, the main server 300 transmits verification packets to the mobile terminal 306 as shown by step 604. The verification packets inform the mobile terminal 306 that the main server 300 recognizes the terminal as a valid user of the main server resources. The main server 300 is then ready to perform a requested transaction for the mobile terminal 306. In step 606, the mobile terminal 306 sends data packets to the main server 300 requesting to open a file located on a file server of the main terminal 300. The main server 300 receives the file request and then determines the application software that allows the opening of the file as shown in step 608. The main server 300 then starts the appropriate application software, opens the requested file, and sends data packets to the mobile terminal 316 that allow the mobile terminal to view the requested file.

Once the file is opened by the mobile terminal 306, the user of the mobile terminal 306 may want to print out the file. In step 610, the mobile terminal 306 sends data packets to the main server 300 requesting printing of the file opened. Once the main server 300 receives the print request, the main server must determine whether the printer is accessible to the main server. In step 612, the main server 300 sends data packets to the printer 308, for example, to determine if the printer exists and is on line. In step 614, the printer 308 sends data packets to the main server 300 indicating that it exists and ready to print. In an alternative embodiment, the main server 300 may determine that the printer 308 exists and is on line by maintaining a list of items connected to the network as described with respect to FIG. 4.

Once the main server 300 determines that the printer 308 is available, the main server 300 sends data packets containing the file to be printed to the printer 308 as shown in step 616. The file is then printed on a print medium loaded in the printer 308. Thus, steps 606 through 616 of FIG. 6 indicate the method for the mobile terminal 306 accessing and opening a file on the main server 300, and then printing the opened file on network printer 308.

With the file printed, the user of mobile terminal 306 may want to access the Internet 120. In a preferred embodiment, the mobile terminal 306 and/or main server 300 includes Web browser software for communicating with remote web servers via Internet 120. To access web pages on a remote server, the user inputs a uniform resource locator (URL) identifying the location of the requested web page. Details of accessing and using the Internet may be found in "How The Internet Works", by Preston Gralla, the entire contents of which is incorporated herein by reference. Thus, in step 618, the mobile terminal 306 sends data packets to the main server 300 requesting access to the Internet website www.ricoh.com, for example. The main server 300 receives the Internet access request and, in step 620, the main server uses proxy software to go to the requested website after a security dialog with the user. The main server 300 then uses the URL to access the requested website and sends data packets of the content of the web site, such as web pages, to the mobile terminal 306. Thus, FIG. 6 illustrates how a mobile terminal can utilize the software, hardware, and Internet resource of the wireless network in accordance with the present invention.

Figure 7:
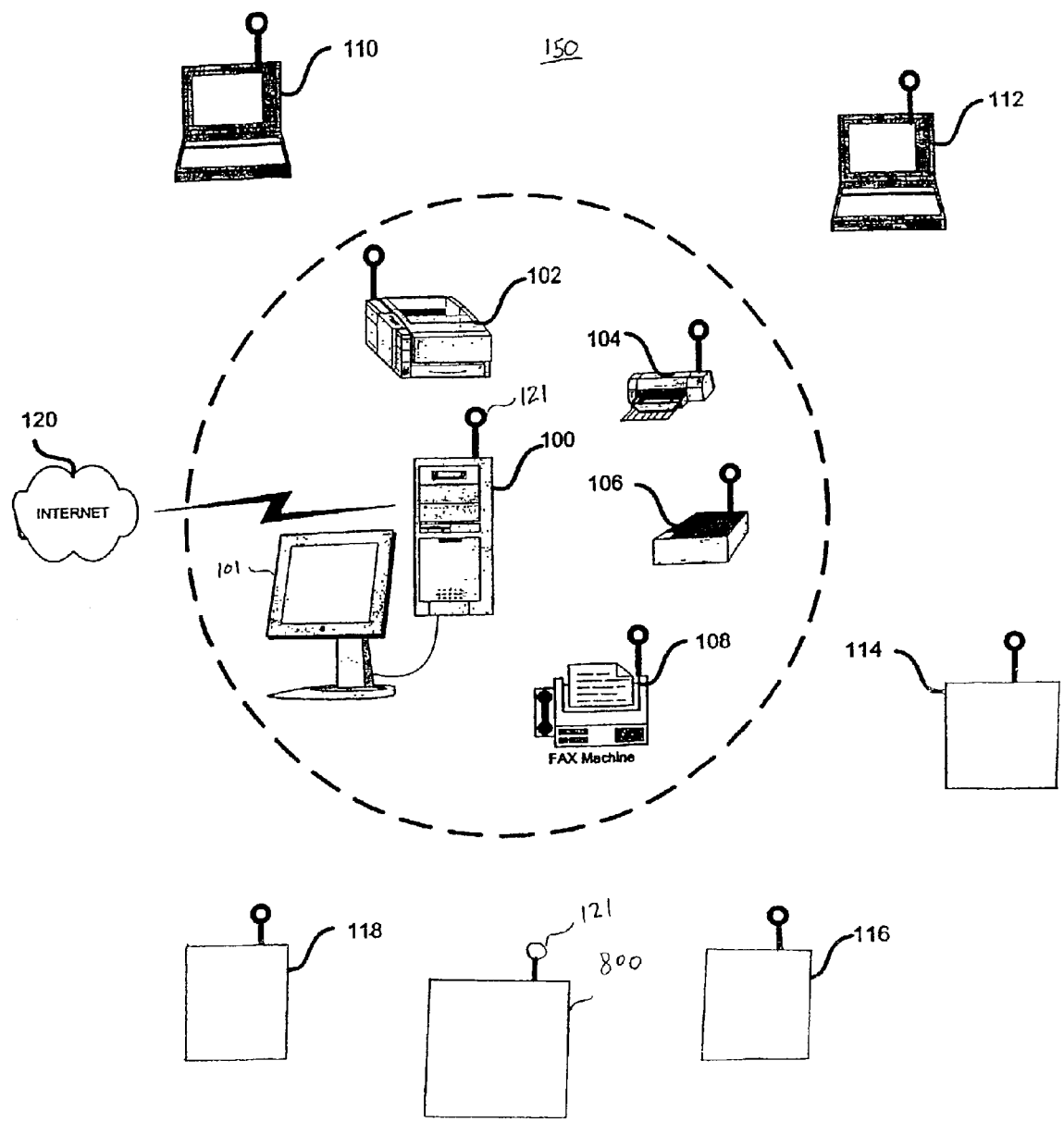
FIG. 7 is a system diagram illustrating a system for managing and controlling a local network of electronic devices using a control device in accordance with an embodiment of the present invention.

As described above, the electronic devices may be managed and resources may be shared using a main server to communicate via the wireless LAN. In another embodiment of the present invention, a portable control device provides a uniform interface for manual control of the electronic devices on the wireless LAN. FIG. 7 is a system diagram illustrating a system for managing and controlling a local network of electronic devices using a control device. The system of FIG. 7 is identical to the system of FIG. 1 except that the system of FIG. 8 includes control device 800 as well as applications software that allows remote manual control of electronic devices using the control device 800. As with the other devices on the LAN, the control device 800 includes a transceiver and antenna 121 for communicating wirelessly with the main server 100 and other nodes of the LAN. The control device is a lightweight handheld device similar to a remote control for a television, for example. However, the antenna 121 of the control device emits an omnidirectional signal rather than the directional infrared signal of the conventional remote control device. Therefore, the control device 800 can control the electronic devices on the wireless LAN without being in line of sight of the device to be controlled.

Figure 8:
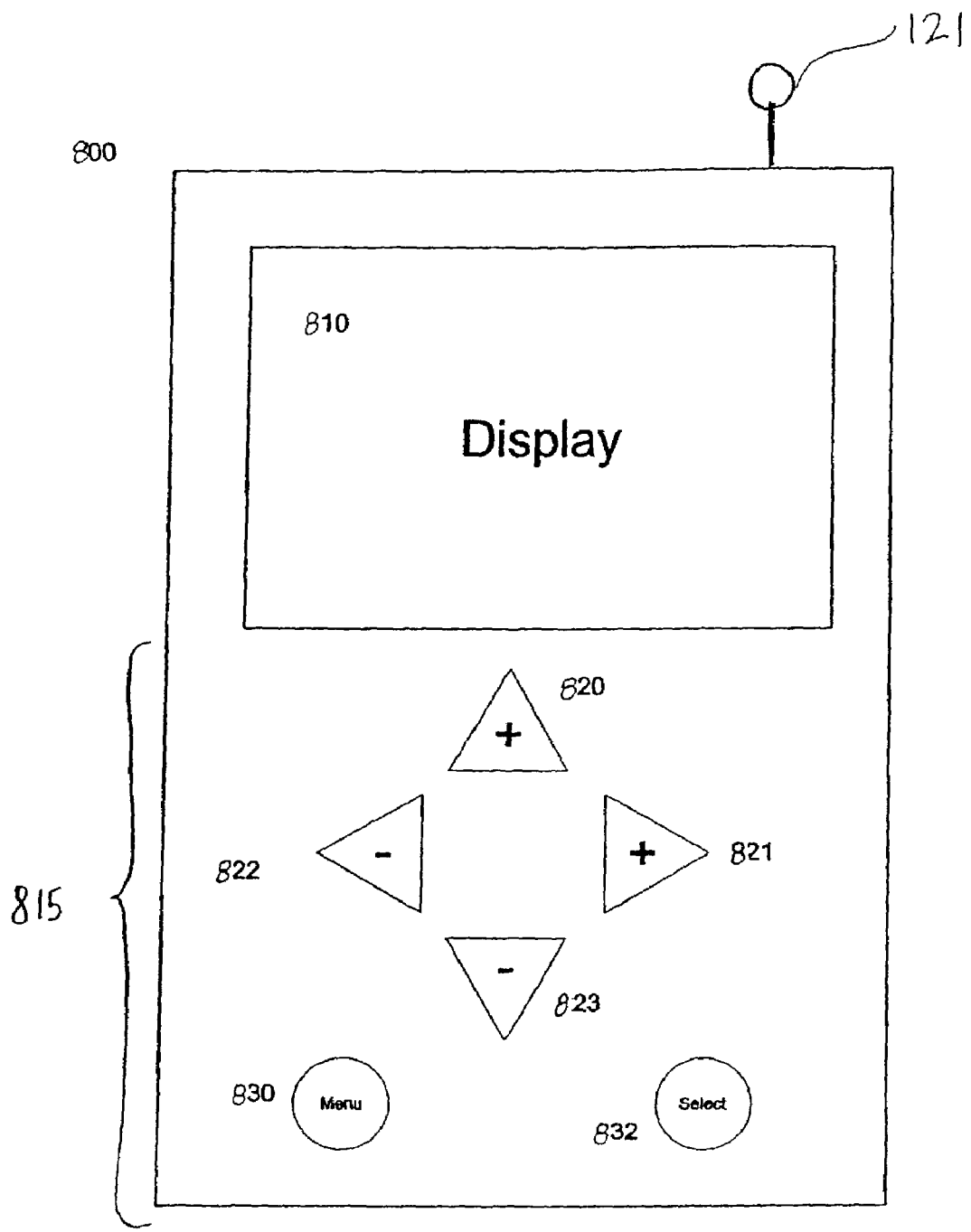
FIG. 8 is an illustration of the control panel of a control device in accordance with one embodiment of the present invention.

FIG. 8 is an illustration of the control panel of the control device 800. As seen in this figure, the control device includes a display 810 and an input keypad 815. The display is preferably a liquid crystal display (LCD), but may be implemented as any one of the known display devices. The keypad 815 includes up directional button 820, right directional button 821, left directional button 822, down directional button 823, and menu and select buttons 830 and 832 respectively. The directional buttons 820 through 823 are used to navigate through menus displayed on the display 810. The menu button 830 and the select button 832 are used to initiate the display of a menu and to select items in a menu as will be further described below. In a graphical user interface environment, the directional buttons and menu and select buttons may be configured to operate as a mouse. Thus, the control device 800 is a simple portable wireless device for displaying, navigating and selecting control menus for the electrical devices connected to the wireless LAN.

Figure 9:
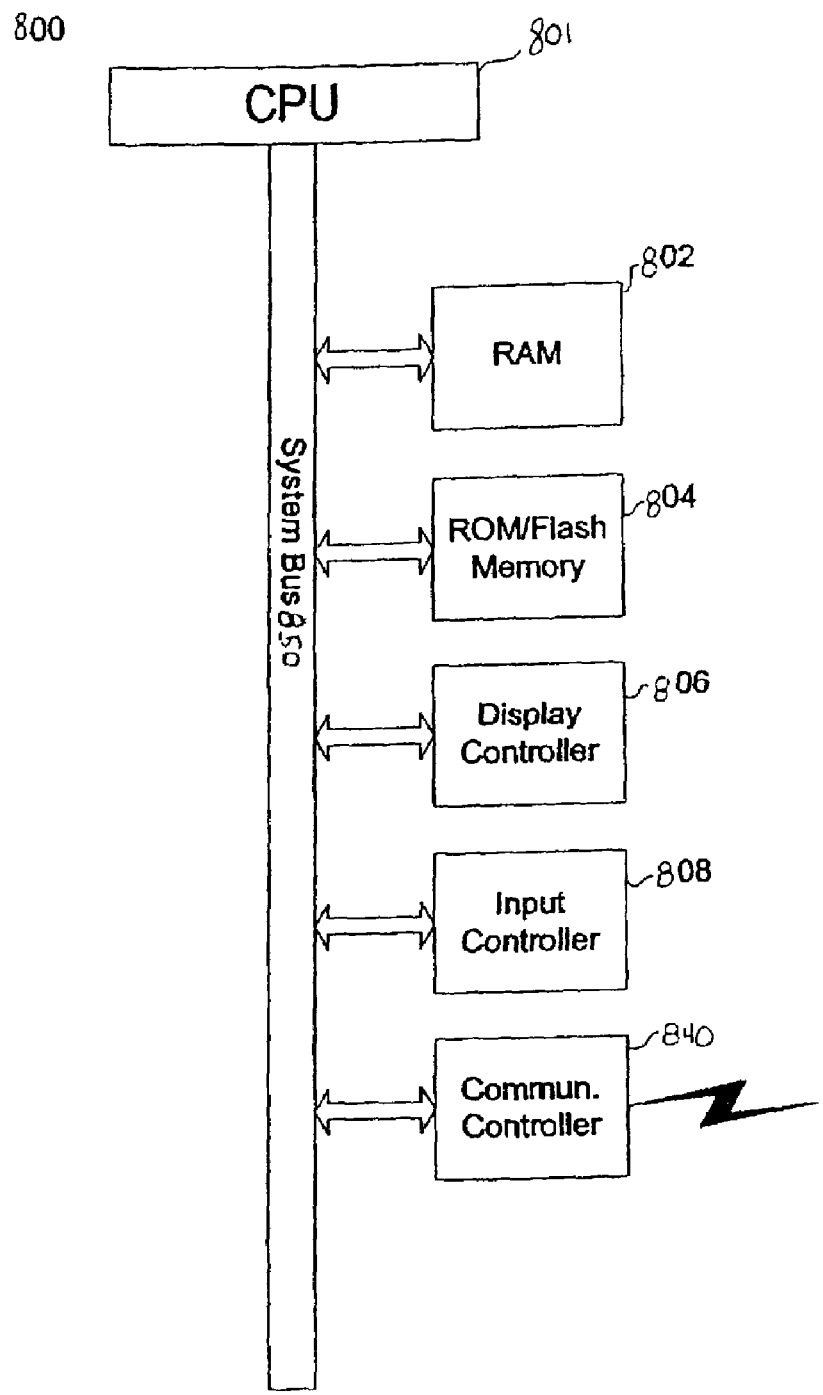
FIG. 9 is a block diagram of a control device in accordance with one embodiment of the present invention.

FIG. 9 shows a block diagram of the control device 800. The control device 800 includes CPU 801, RAM 802, ROM 804, display controller 806, Input controller 808, and communications controller 840. The various units of the control device 800 are interconnected by way of system bus 850. The CPU 801 processes instructions or sequences of instructions stored in the RAM 802 and/or ROM 504 in response to input commands of a user via input controller 508. The display controller controls the display of images and text on the display in response to commands from the CPU 801. Communications controller 840 allows the control device 800 to receive and process wireless digital data from the main server and other electronic devices on the wireless LAN. It is to be understood that the items in the block diagram of FIG. 9 are exemplary items intended to provide a functional description of the control device 800. The control device may incorporate any of the components of a known wireless computing device such as the Palm Pilot manufactured by Palm, Inc. In addition, the control device may include any of the features of a general computing device such as the device described in FIG. 18.

Figure 10:
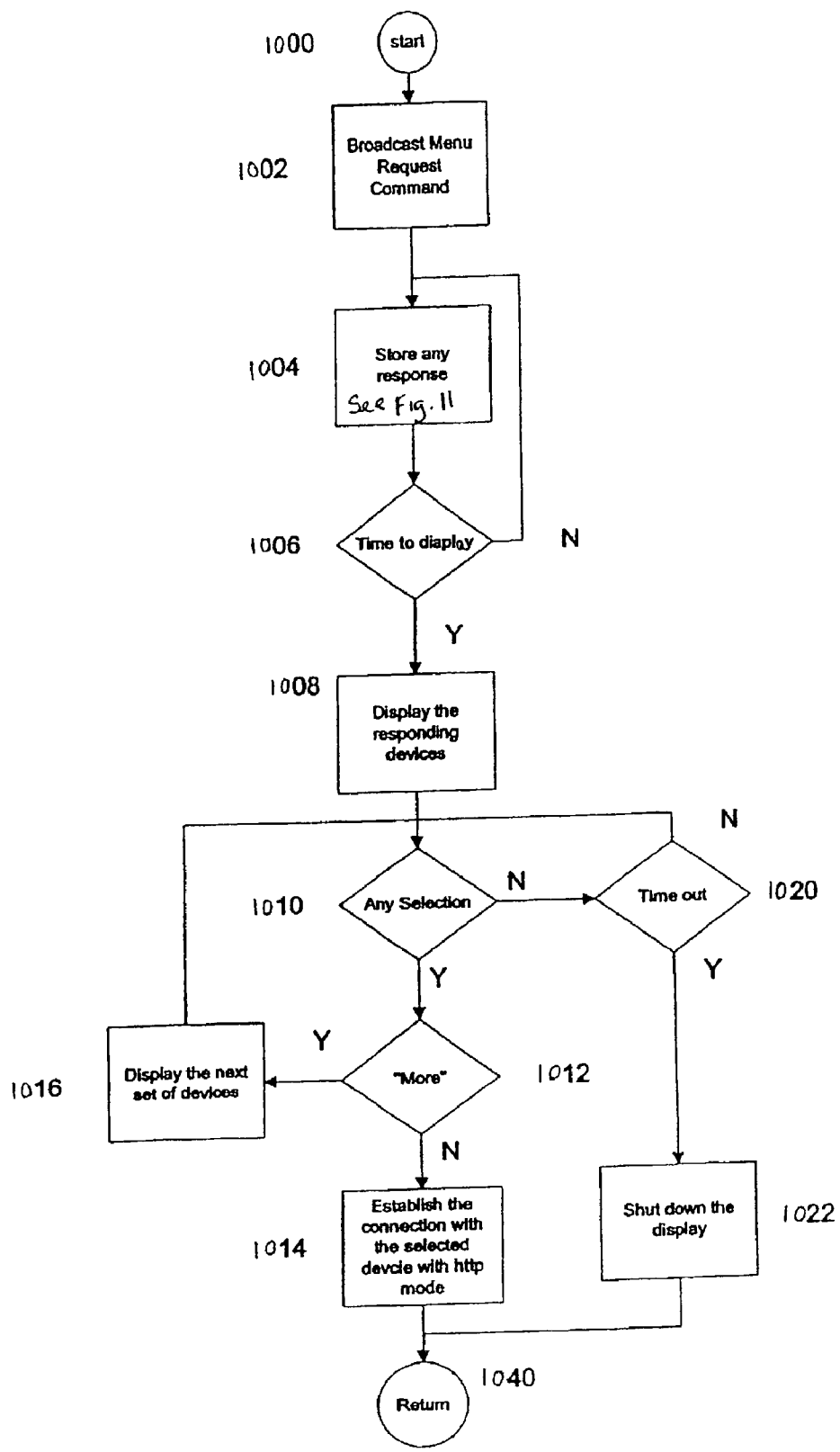
FIG. 10 is a flow chart illustrating the process manually controlling electronic devices using a control device in accordance with an embodiment of the present invention.

FIG. 10 is a flow chart indicating the process of manually controlling electronic devices using the control device 800 in accordance with the present invention. The process begins at step 1000 when the user of the control device 800 presses the menu button 830 on the input keypad 815. In step 1002, a Menu Request command is broadcast to the devices on the wireless LAN. The menu request message is a generic message requesting electronic devices on the wireless LAN to identify themselves and provide a location for the control menu of the respective electronic device. In one embodiment of the present invention, the control device 800 may request identification and control menu information only from electronic devices that are capable of communicating using a predetermined protocol used by the control device 800 such as hypertext transfer protocol (http). In another embodiment, the control device 800 requests identification and control menu information from all electronic devices on the network through the main server 100 and the main server converts the menu information to a communication protocol understandable to the control device 800 as will be further described below. Once the Menu Request command is sent, the control device 800 receives and stores any responses received from the electronic devices on the wireless network.

Figure 11:
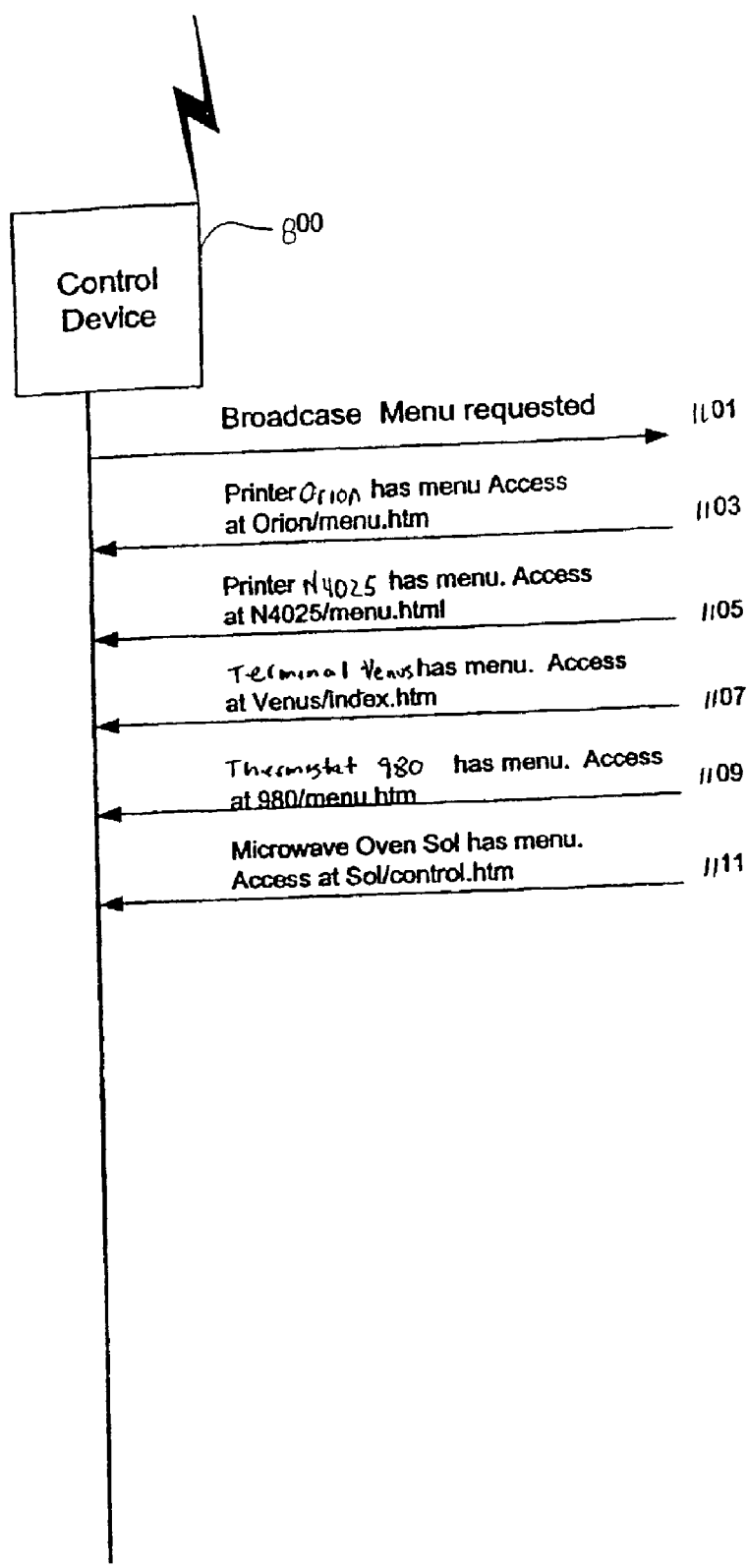
FIG. 11 is a sequence diagram showing the communication correspondence of a control device according to one embodiment of the present invention.

As with the main server of FIG. 1, the control device 800 may use any known MAC protocol to ensure that only one device of the wireless LAN has access to the shared link of a multiple access link at any one time. For example, FIG. 11 shows the communication correspondence when the Menu button is pressed at the control device 800. At the step 1101 the control device 800 broadcasts the menu request. Step 1101 corresponds to step 1002 in the flow chart of FIG. 10. In step 1103, the control device 800 receives a response from a first electronic device, the printer 102, for example. As seen in FIG. 11, the printer 102 is identified as printer "Orion" and has a menu location at Orion/menu.htm. The MAC used by the control device 800 allows only the printer Orion to communicate with the control device 800 at the time of step 1103. After this communication is completed, the control device receives a response from the printer identified as "N4025" which has a control menu at N4025/menu.html as seen in step 1105. Again, N4025 is the only node of the network that communicates with the control device 800 at the time of step 1105. The control device 800 then sequentially receives a response from the terminal "Venus," the thermostat "980," and the microwave oven "Sol" as illustrated in FIG. 11. While all of the responding devices of FIG. 11 are shown to have HTTP menu capability, the present invention does not require such a common protocol as mentioned above. Moreover, the control device 800 may poll the devices on the network registered on the server to determine the HTTP protocol.

Figure 12:
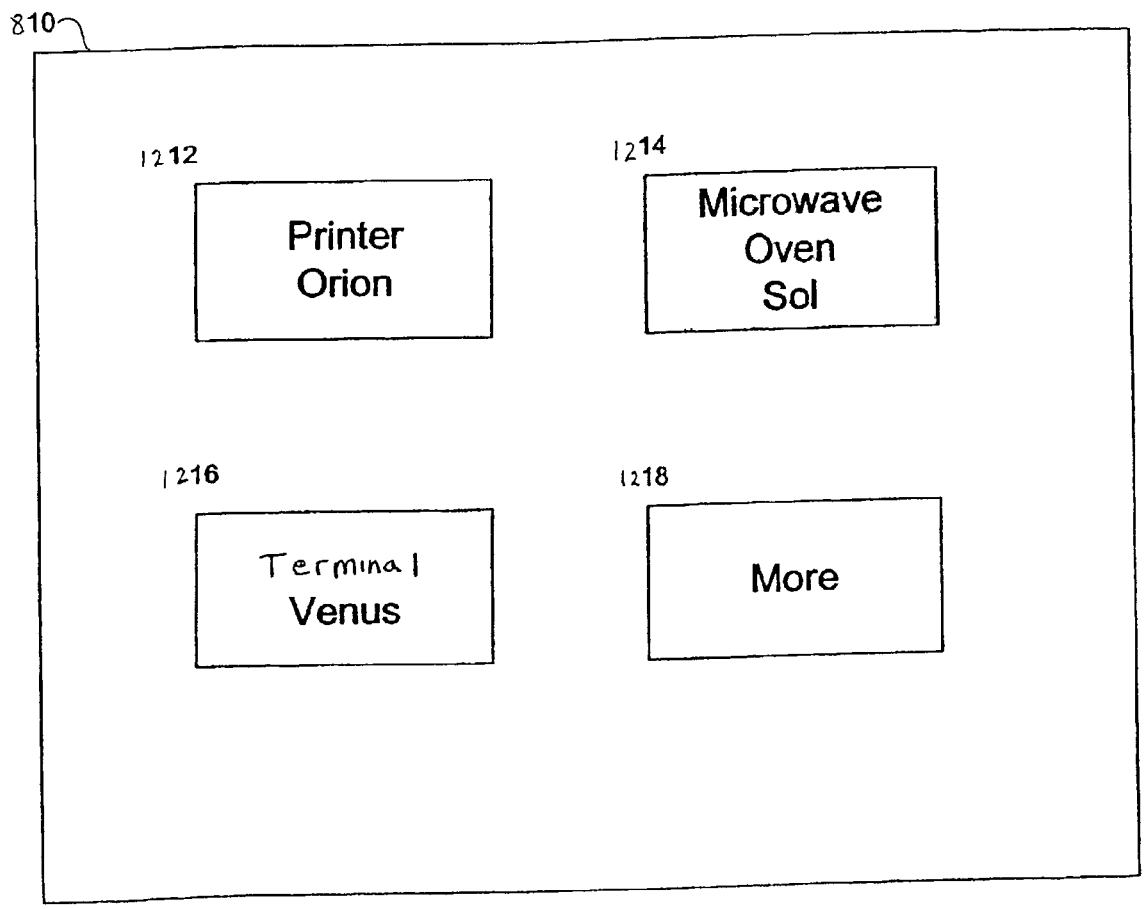
FIG. 12 is an illustration of a control device display displaying a graphical display of selection boxes according to an embodiment of the present invention.

Returning to the flow chart of FIG. 10, in decision block 1006, the control device 800 determines whether a predetermined time for responding to the menu request has lapsed. If the time has not lapsed, the control device 800 returns to step 1004 where it receives and stores more replies and menu locations of electronic devices connected to the wireless LAN as described with respect to FIG. 11. If the time to reply has expired, the control device 800 proceeds to step 1008 where the responding devices are displayed on the display 810 of the control device 800. The devices may be displayed in text format including the device identification and/or the location of the menu file on the main server 100 as exemplified in the text of FIG. 11. Alternatively, the list of devices may be a graphical display of icons or selection boxes with a device associated with each icon or selection box as shown in FIG. 12, which will be further described below. In a preferred embodiment, the control device displays the responding devices using a web supported cellular phone format so that a large display is not required.

After the responding devices are displayed on the control device 800, the control device determines whether a selection from the list has been made by the user as shown by decision block 1010. As indicated above, the user selects a device from the list displayed by using the input keypad 815 on the control device 800. If no selection has been made, the control device proceeds to decision block 1020 where it determines whether a predetermined time for making a selection has passed. If the selection time has passed, the control device 800 shuts down the display in step 1022 to preserve the battery power of the control device 800. Where a selection from the displayed list is made, the control device 800 proceeds to decision block 1012 where the control device determines if the selection made is a "more" selection.

In a preferred embodiment of the present invention, the control device 800 may receive and store the identification and menu location information for a larger number of electrical devices than can be displayed on the display 810 of the control device 800. Where such a large number of devices respond to the broadcast, the control device 800 displays a first group of the responding devices on the display along with a "more" option as shown in FIG. 12. FIG. 12 is an illustration of the display 810 displaying a graphical display of selection boxes according to an embodiment of the present invention. As seen in this figure, selection box 1212 is associated with printer Orion, selection box 1214 is associated with microwave oven Sol, and selection box 1216 is associated with terminal Venus. Thus, the display of FIG. 12 displays the electronic devices that responded in the communication protocol of FIG. 11. In this regard, the selection box 1218 is provided because there are responding devices that cannot be displayed on the display 810, namely the printer N4025 and the thermostat 980.

Where the selection is the "more" selection box 1218, the control device 800 displays a second group of responding devices on the display 810 as indicated by step 1016 of FIG. 10. Where the selection is not the "more" selection box 1218, but rather an electronic device, the control device 800 establishes a connection with the selected device as shown in step 1014. In a preferred embodiment, the selection box of the selected item is shown on the display 810 in a highlighted fashion as shown by selection box 1214 of FIG. 12.

After the selection is made by the user, the control device 800 establishes a connection with the selected electronic device as seen in step 1014. As indicated above, one embodiment of the control device 800 receives and processes responses only from devices having an http protocol menu. In this embodiment, the control device 800 establishes a wireless connection directly with the selected device with an http mode. This allows communication with the selected device with limited intervention by the main server 100. In another embodiment, the control device 800 receives a response from all electronic devices including devices that have menu controls incompatible with the communication protocol of the control device. In this embodiment, step 1014 of establishing a connection with the selected device includes a step for determining whether the selected device has the same communication protocol as the control device or not. If the selected device has a different menu protocol, i.e. not http for example, the control device then contacts the main server 100 also as part of step 1014. The main server 100 includes software for translating the unfamiliar protocol of the selected device to a protocol understandable to the control device 800. Thus, step 1014 of establishing a connection with the selected device requires a connection be made through the main server 100. With the http connection established, the control device 800 exchanges control data with the electronic device to control the aspects of the electronic device.

An alternative approach to network management by the device 800 is to use the server 100 for the actual communication with the devices. The main server can communicate with network devices through the best control mode such as SNMP and device proprietary protocols. Then the control device 800 can communicate with the server through HTTP to provide uniform interface to the user for controlling the devices. That is, all communications with all electronic devices, compatible and incompatible with the control device 800, are made through the server 100. This network management configuration allows the powerful server to provide network and communications features that cannot be supported by the mobile control device 800.

Figure 13:
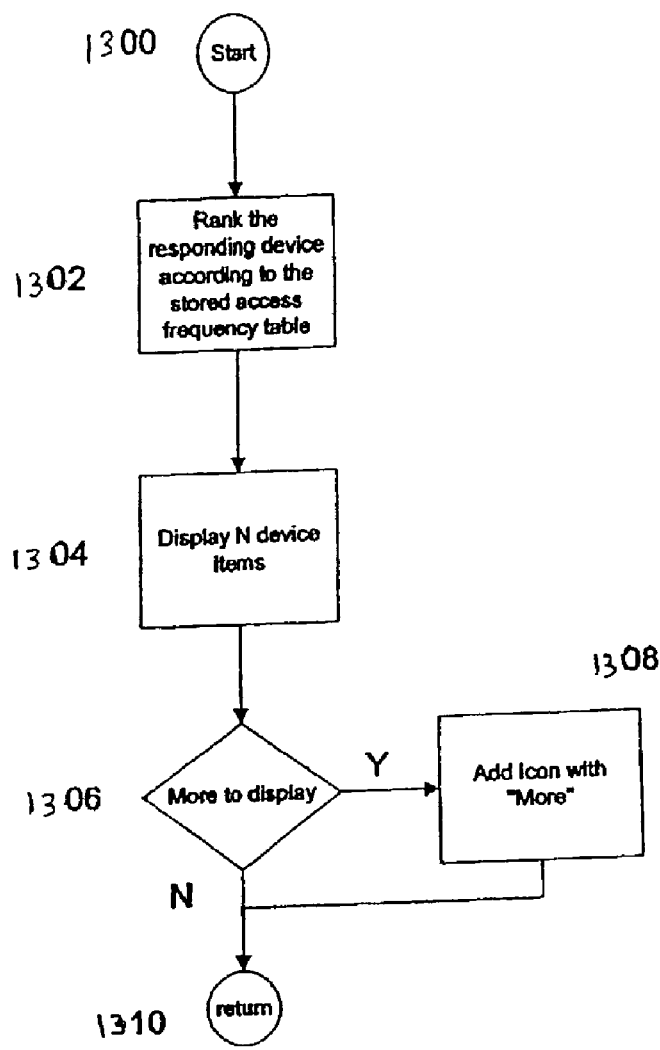
FIG. 13 is a flow chart illustrating a process for displaying the responding electronic devices on a control device in accordance with one embodiment of the present invention.

According to a preferred embodiment, the control device 800 provides the listing of responding electrical devices on the display 810 in a predetermined order. FIG. 13 is a flow chart illustrating a process for displaying the responding electronic devices on the control device in accordance with one embodiment of the present invention. In step 1302, the control device ranks the responding devices in accordance with a stored access frequency table. The access frequency table is a file that keeps track of user access to each of the electronic devices in the wireless local area network. With the responding devices ranked, the control device 800 displays N devices on the display 810 as shown by step 1304 where N represents the number of devices capable of being displayed on the display 810 at one time, N is determined by the display resolution and size. At step 1306, if there are more devices responding than N devices, the system adds "More" icon or word in the step 1308. At step 1310, it returns to the calling process.

Figure 14:
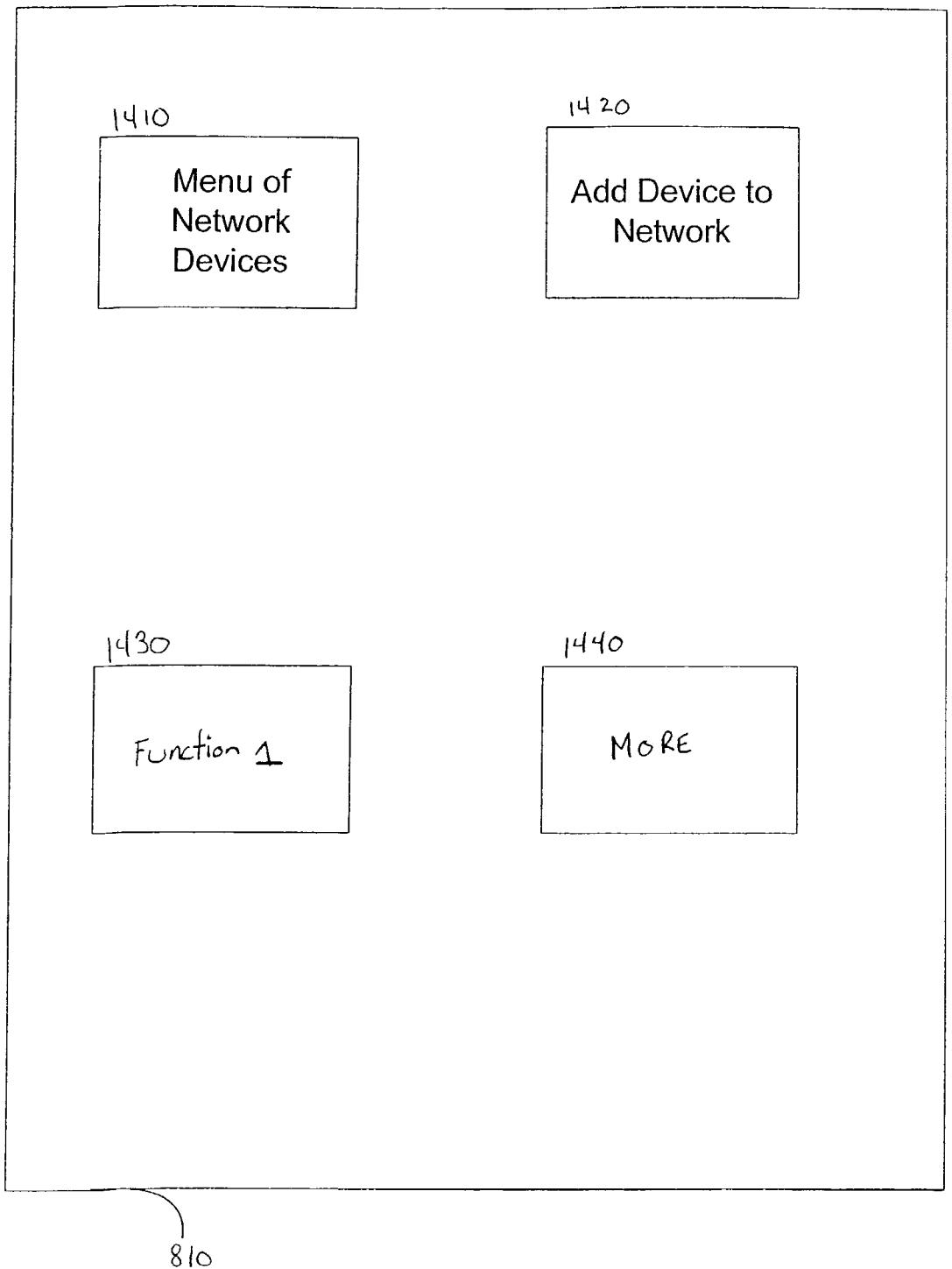
FIG. 14 is an illustration of the display displaying a graphical display of function selection boxes according to the present embodiment of the invention.

Thus, the control device 800 may be used as a portable device for providing a uniform interface for manual control of the electronic device on the wireless LAN. In this embodiment, the menu button 830 on the input keypad 815 initiates the broadcast of a menu request command from the control device to the devices on the LAN as described above. In another embodiment, the control device 800 may be used to provide various network functions for the LAN. In this embodiment, the menu button 830 of the input keypad 815 causes a menu of available functions to be displayed on the display 810. FIG. 14 is an illustration of the display 810 displaying a graphical display of function selection boxes according to the present embodiment of the invention. As seen in this figure, function selection box 1410 is associated with the function of obtaining a menu of network devices, box 1420 is associated with the function of adding a device to the network, and box 1430 is associated with the miscellaneous function labeled "function 1." As with the graphical display described in FIG. 12, the display of FIG. 14 includes a "More" selection box 1440 for displaying additional functions. As also described with respect to FIG. 12, the user of the control device 800 manipulates the direction buttons 820–823 on the input keypad 815 to make menu selections on the display 810 to initiate the functions associated with the selected function selection box. For example, selection of box 1410 causes the control device 800 to perform steps 1000–1040 described in FIG. 10. Selection of box 1420 causes the control device 800 to be used as a registration device for reliably and securely adding new network devices to the appropriate LAN in an environment where several wireless LANs exist.

Figure 15:
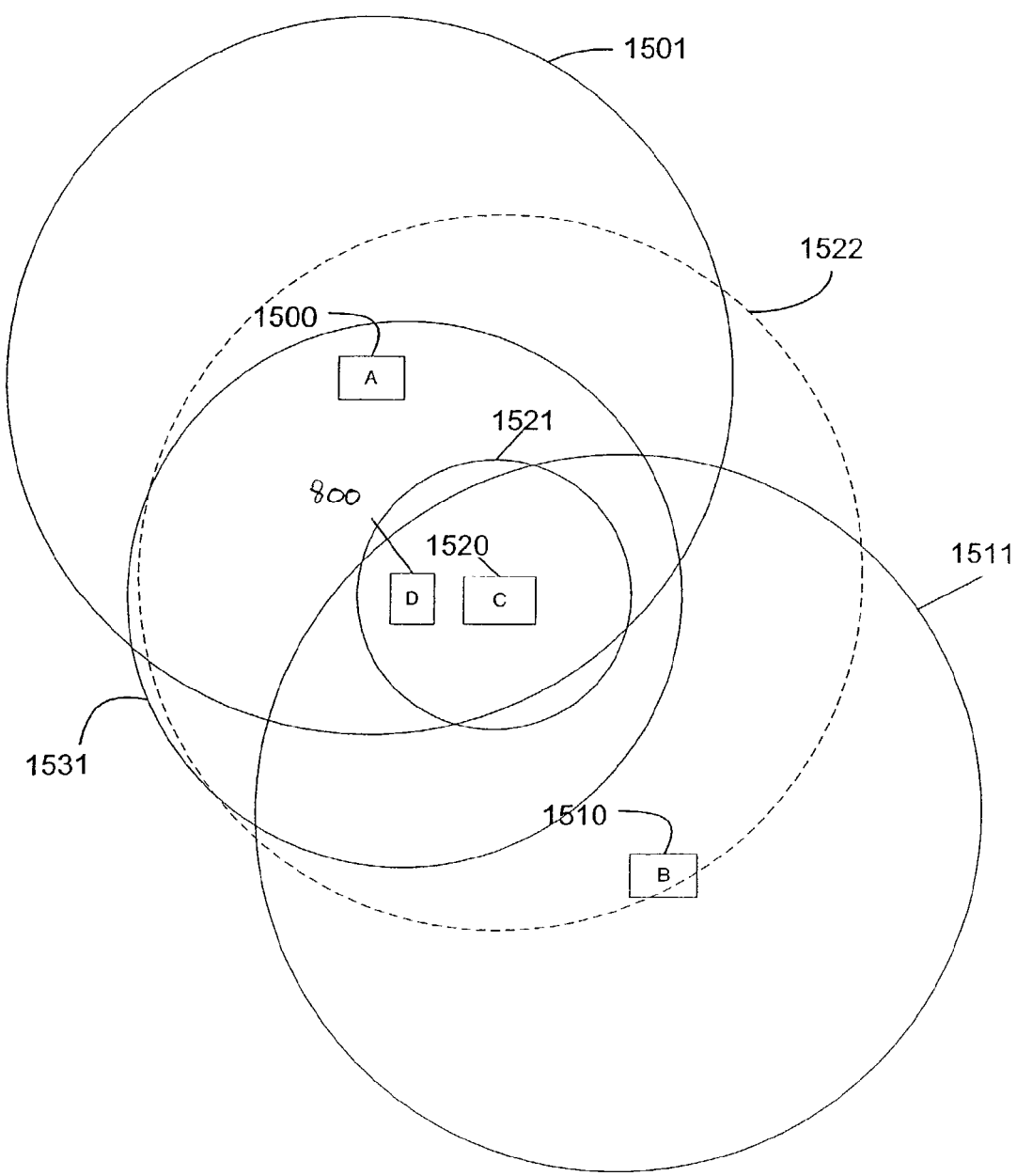
FIG. 15 shows an example of an environment where the control device is useful as a registration device for adding new electronic devices to a LAN.

FIG. 15 shows an example of an environment where the control device 800 is useful as a registration device for adding new electronic devices to a LAN. In FIG. 15, A device 1500 serves as an access point for one network while B device 1510 serves as an access point for a second network. The access points may be hardware or software access points. The network associated with A device 1500 has a range 1501, while the network associated with B device 1510 has a range 1511. C device 1520 in FIG. 15 is a device to be added to the network associated with A device 1500, for example, and has a short communication range designated by the circle 1521, as well as a full communication range designated by the dashed circle 1522. D device 800 is a control device used to setup C device 1520 to join of the network associated with A device 1500, for example, as will further described below.

Each of the A device 1500 and B device 1510 may be a server or attached to a server such as the servers described in FIGS. 1–3, and may be implemented as a general purpose computer such as the general purpose computer 1801 described in FIG. 18. The C device 1520 may be any one of the wireless electronic device described in FIGS. 1–3 as equipment connected to a wireless LAN. The C device has a variable RF output power that is controlled by software as will be further described below. The D device 800 is preferably implemented as the control device 800 provided with the necessary hardware and/or software to perform the function of adding the C device 1520 to a network. As seen in FIG. 15, the range 1501 associated with A device 1500 overlaps the range 1511 associated with B device 1510. In this regard, the networks of the A device 1500 and B device 1510 maybe networks of neighboring homes such as the home 216 described in FIG. 2. Alternatively, the networks of the A device 1500 and B device 1510 may be nearby office spaces in a shared office building such as the building 326 in FIG. 3. As also seen in FIG. 15, the full range of the C device to be added to the network associated with the A device is large enough to reach both the A device 1500 and B device 1510, which serve as access points for their respective networks. Thus, C device 1520 operated at full power may be inadvertently joined to the network associated with B device 1510 rather than the intended network associated with A device 1500. That is, if the full communication range of C device 1520 is available at the first power on time, there is a possibility that C device may be compromised by others, such as the network supported by B, before joining the network supported by A. However, according to the present embodiment, the D device (i.e. control device) 800 is used to setup the C device (i.e. wireless electronic device) 1520 to join in the network associated with the A device 1500.

Figure 16:
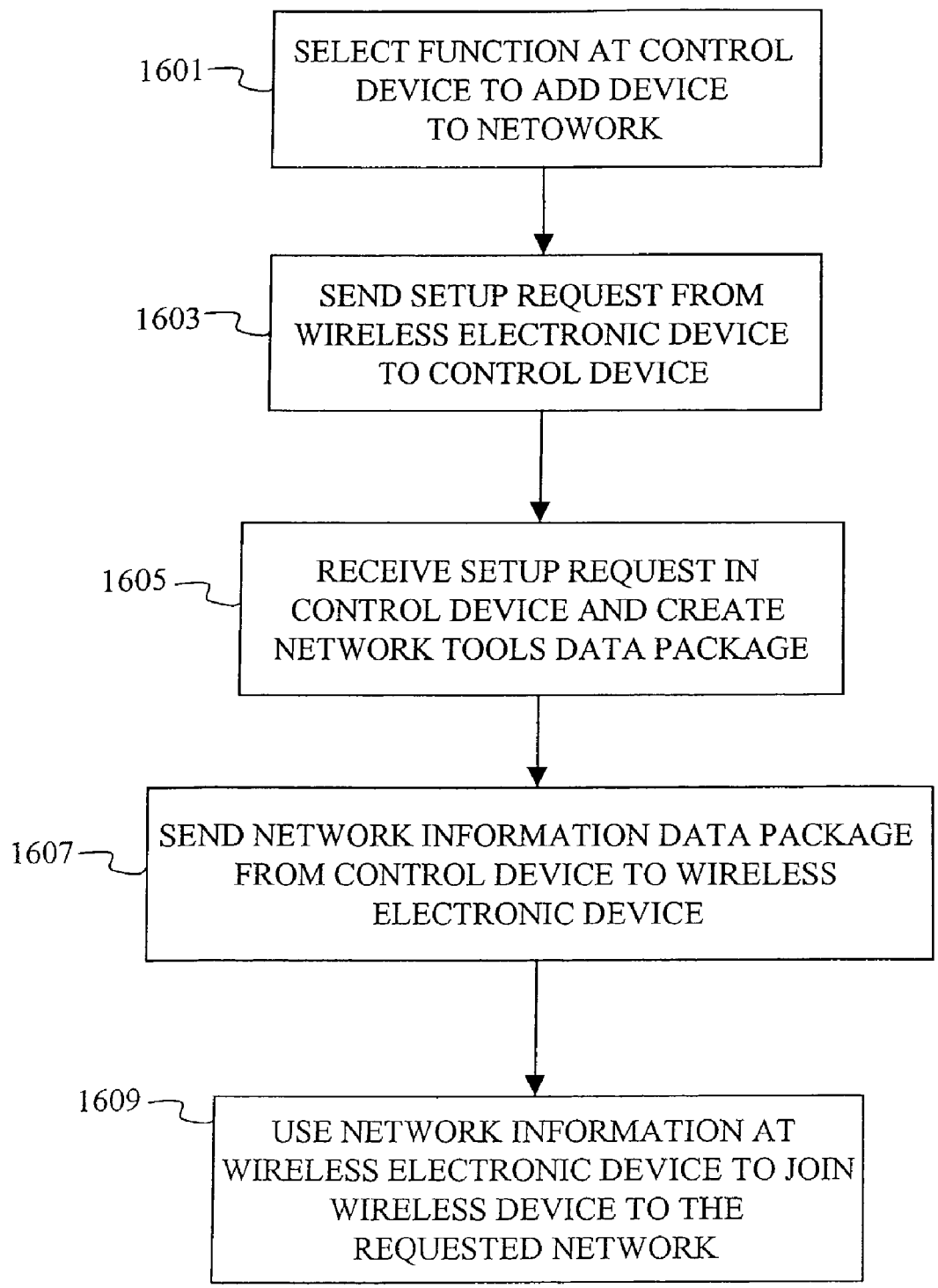
FIG. 16 is a flow chart illustrating a process according to the present invention of using a control device to add a wireless electronic device to a wireless LAN.

FIG. 16 is a flow chart illustrating a process of using a control device to add a wireless electronic device to a wireless LAN. Although FIG. 16 is described with respect to the example of using the control device 800 to add the wireless electronic device 1520 to the network associated with the A device 1500, it is to be understood that the present invention is not limited to this specific example. The process begins in step 1601 with the user selecting the function selection box 1420 on the control device 800 to add a device to the network as described in FIG. 14. This action prompts the control device 800 to await a setup request for the wireless electronic device. In step 1603, the wireless electronic device sends a setup request to the control device 800. The setup request includes information necessary for the control device 800 to setup the wireless electronic device 1520 on a network. For example, the request includes an IP address/DHCP information, net mask, and an identification of a network that the wireless electronic device wants to join (the network of A device 1500 in the example above), as well as an identification of the type of wireless electronic device making the request. In a preferred embodiment of the invention, the setup request sent from the wireless electronic device 1520 also includes a request for optional network services. Optional network services are network services not necessary for the wireless electronic device 1520 to join the network associated with A device 1500, such as encryption, backup storage and other similar functions.

The setup request is a limited access communication that may be either a request sent via a hard-wired medium or a wireless request. Where the request is sent by a hardwired medium, the user must physically link the control device 800 to the wireless electronic device 1520 by way of a cable or special purpose connection port. By virtue of this hard wire connection, access to the wireless electronic device 1520 is limited to those control devices actually connected to the wireless access device 1520 Where the setup request is sent wirelessly, the wireless electronic device 1520 may continually transmit the setup request when power is applied to the wireless electronic device 1520, or send the request only after receiving a prompt from the control device 800. Moreover, the wireless electronic device 1520 transmits the wireless setup request at a low power that limits the communication range of the wireless electronic device as indicated by circle 1521 in FIG. 15. Thus, the limited communication range limits the access to the wireless electronic device 1520 to those control devices within the reduced power communication range. In a preferred embodiment, the reduced power provides a limited communication range of 1 meter, for example. By limiting the communication range of the wireless electronic device, the wireless electronic device is unable to communicate with the networks associated with the A device 1500 and B device 1510 prior to a wireless connection with one of these devices being enabled by the control device 800.

Once the wireless electronic device 1520 sends the setup request, the control device 800 receives the setup request and creates a data package of network information necessary to join the wireless electronic device 1520 to the requested network as shown in step 1605. The package of network information includes an IP address/DHCP information, net mask, and the wireless communications protocol of the network that the wireless electronic device 1520 identified in the setup request, as well as software compatible with the wireless electronic device type identified in the setup request. In particular, the network information include a communications coding scheme that enables the wireless electronic device 1520 to communicate only with the A device 1500, and not with the B device 1510, which has a different coding scheme. Moreover, where the setup request included a request for optional network services, the control device 800 also includes in the data package, software tools necessary to implement the requested optional network services. Once the network information data package is created, the control device 800 sends the data package to the wireless electronic device 1520 as shown in step 1607. As with the setup request, the network information data package may be delivered either wirelessly or by way of a hardwired medium.

In step 1609, the wireless electronic device 1520 uses the received network information to join the network identified in the setup request. As noted above, the network information provided to the wireless electronic device 1520 include a coding scheme that allows the wireless electronic device 1520 to communicate wirelessly only with the network identified in the setup request. Thus, returning to the above example, in step 1609, the wireless electronic device 1520 establishes a wireless link with the network associated with A device 1500. In a preferred embodiment, the wireless electronic device 1520 communicates with the network at full transmit power. Thus, where the exchange of data between the wireless electronic device 1520 and the control device 800 occurred wirelessly at a reduced power as described above, step 1609 also includes increasing the output power of the wireless electronic device 1520 to the full range of the wireless electronic device shown by dashed circle 1522 in FIG. 15. The coding scheme used by the wireless electronic device 1520 ensures that such device will only join the network of A device 1500.

Figure 17:
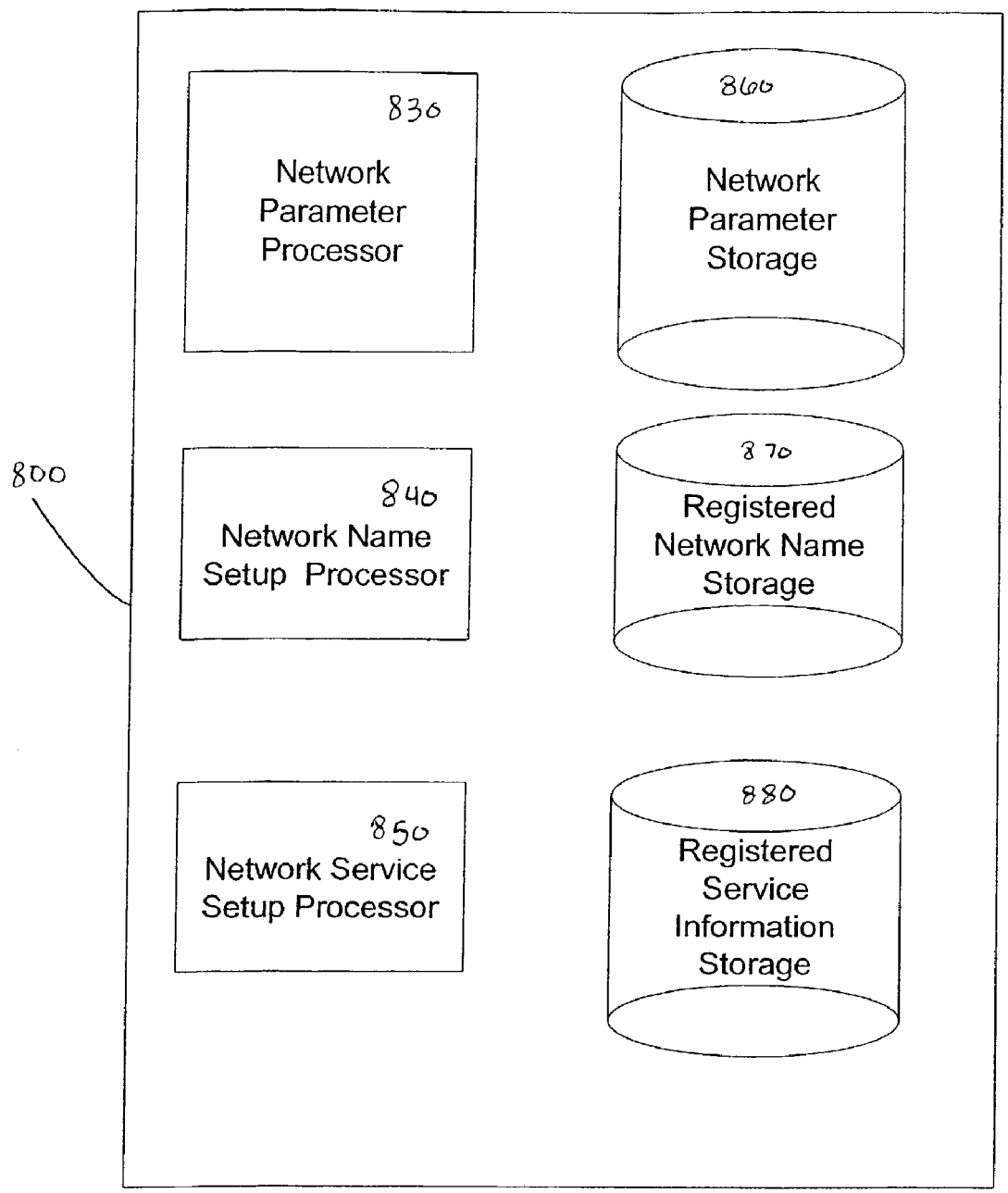
FIG. 17 is a functional block diagram of a special purpose mobile device according to an embodiment of the present invention.

As described above, the control device 800 of FIG. 8 is preferably used to provide the function of adding an electronic device to a particular network. Thus, the elements 801–840 shown in FIG. 9 can be modified and/or software provided to the control device 800 to implement this function. However, special purpose elements may be provided to implement the function of adding a device to a LAN. FIG. 17 is a functional block diagram of a special purpose mobile device D 800' having a network parameter processor 830, network name processor 840, and network service setup processor 850 contained in the device 800'. Also included is network parameter storage 860, registered network name storage 870, and registered service information storage 880. Network Parameter Storage 860 stores the necessary information for the new device to be added to the local network. The information (parameters) includes address information, encryption information, protocol information and other standard network information. Network Parameter processor 830 takes care of necessary software and hardware components to send the parameters to the target device C 1520. Network Parameter processor 830 may include software components such as DHCP. Registered Network Name Storage 870 contains the necessary names to establish the network, such as a domain name and work group name, and the Network Name Setup Processor 840 provides the processing necessary to establish a network. Registered Service Information Storage 880 contains services available to the local network and necessary information to use the services, while the Network Service Setup Processor 850 provides the processing necessary to implement such services. Such services include e-mail with SMTP service and POP 3 server information, and web with Proxy Server information.

FIG. 18 illustrates an alternative portable computer system 1801 upon which an embodiment according to the present invention may be implemented. As indicated above, the computer system 1801 may function as the main sever in accordance with the present invention. Computer system 1801 includes a bus 1803 or other communication mechanism for communicating information, and a processor 1805 coupled with bus 1803 for processing the information. The processor 1105 may be implemented as any type of processor including commercially available microprocessors from companies such as Intel, AMD, Motorola, Hitachi and NEC.

The computer system 1801 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 1801 using an appropriate device bus (e.g., a small computer system interface (SCSI) bus, an enhanced integrated device electronics (IDE) bus, or an ultra-direct memory access (DMA) bus). The computer system 1801 may additionally include a compact disc reader, a compact disc reader-writer unit, or a compact disc juke box, each of which may be connected to the same device bus or another device bus.

Computer system 1801 may be coupled via bus 1803 to a display 1813, such as a cathode ray tube (CRT), for displaying information to a computer user. The display 1813 may be controlled by a display or graphics card. The computer system includes input devices, such as a keyboard 1815 and a cursor control 1817, for communicating information and command selections to processor 1805. The cursor control 1817, for example, is a mouse, a trackball, or cursor direction keys for communicating direction information and command selections to processor 1805 and for controlling cursor movement on the display 1813.

The computer system 1801 performs a portion or all of the processing steps of the invention in response to processor 1805 executing one or more sequences of one or more instructions contained in a memory, such as the main memory 1807. Such instructions may be read into the main memory 1807 from another computer-readable medium, such as storage device 1811. One or more processors in a multi-processing arrangement may also be employed to execute the sequences of instructions contained in main memory 1807. In alternative embodiments, hard-wired circuitry may be used in place of or in combination with software instructions. Thus, embodiments are not limited to any specific combination of hardware circuitry and software.

As stated above, the system 1801 includes at least one computer readable medium or memory programmed according to the teachings of the invention and for containing data structures, tables, records, or other data described herein. Stored on any one or on a combination of computer readable media, the present invention includes software for controlling the computer system 1801, for driving a device or devices for implementing the invention, and for enabling the computer system 1801 to interact with a human user, e.g., a customer. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 1805 for execution. A computer readable medium may take many forms, including but not limited to, non-volatile media, volatile media, and transmission media. Non-volatile media includes, for example, optical, magnetic disks, and magneto-optical disks, such as storage device 1811. Volatile media includes dynamic memory, such as main memory 1807. Transmission media includes coaxial cables, copper wire and fiber optics, including the wires that comprise bus 1803. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 1805 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 1801 may receive the data on the telephone line and use an infrared transmitter to convert the data to an infrared signal. An infrared detector coupled to bus 1803 can receive the data carried in the infrared signal and place the data on bus 1803. Bus 1803 carries the data to main memory 1807, from which processor 1805 retrieves and executes the instructions. The instructions received by main memory 1807 may optionally be stored on storage device 1811 either before or after execution by processor 1805.

Computer system 1801 also includes a communication interface 1819 coupled to bus 1803. Communication interface 1819 provides a two-way data communication coupling to a network link 1821 that is connected to a local network (e.g., LAN 1823). For example, communication interface 1819 may be a network interface card to attach to any packet switched local area network (LAN). As another example, communication interface 1819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1819 sends and receives electrical, electromagnetic or optical signals that carry digital data streams representing various types of information. The radio waves may be implemented using a spread spectrum technique such as Code Division Multiple Access (CDMA) communication or using a frequency hopping technique such as that disclosed in the Bluetooth specification previously described.

Network link 1821 typically provides data communication through one or more networks to other data devices. For example, network link 1821 may provide a connection through LAN 1823 to a host computer 1825 or to data equipment operated by a service provider, which provides data communication services through an IP (Internet Protocol) network 1827 (e.g., the Internet 607). LAN 1823 and IP network 1827 both use electrical, electromagnetic or optical signals that carry digital data streams. The signals through the various networks and the signals on network link 1821 and through communication interface 1819, which carry the digital data to and from computer system 1801, are exemplary forms of carrier waves transporting the information. Computer system 1801 can transmit notifications and receive data, including program code, through the network(s), network link 1821 and communication interface 1819.

Obviously, numerous additional modifications and variations of the present invention are possible in light of the above teachings. It is therefore to be understood that within the scope of the appended claims the present invention may be practiced otherwise than as specifically described herein.

What is claimed is:

1. A method of using a hand held control device to set a wireless electronic device to join a wireless local area network (LAN) comprising:
   sending a setup request from the wireless electronic device to the hand held control device via a limited access connection, said setup request including a request to be added to the wireless LAN;
   receiving at the wireless device a data package from the hand held control device, the data package including network information necessary for the wireless device to join the wireless LAN; and
   utilizing the network information at the wireless device to establish a full access wireless connection to an access point of the wireless LAN, wherein said full access wireless connection is not provided via said hand held control device.

2. The method of claim 1, wherein said sending step comprises:
   sending information identifying the wireless LAN that the wireless device is requesting to be added to; and
   sending information identifying the type of wireless device requesting to be added to the wireless LAN.

3. The method of claim 2, wherein said receiving step comprises receiving network protocol software operable on the wireless device identified and compatible with the LAN identified.

4. The method of claim 1, wherein:
   said sending step comprises sending information requesting optional network services for the wireless device; and
   said receiving step comprises receiving network information necessary to obtain the optional network services of the wireless LAN.

5. The method of claim 4, wherein said optional network services include at least one of encryption and backup storage.

6. The method of claim 1, wherein said sending a setup request comprises sending a setup request from the wireless electronic device to the control device by way of a hard wired medium that provides limited access to the wireless electronic device.

7. The method of claim 1, wherein said sending a setup request comprises sending a setup request from the wireless electronic device to the control device by way of a wireless medium that provides limited access to the wireless electronic device.

8. The method of claim 7, wherein said sending a setup request by way of a wireless medium comprises sending a wireless setup request to the control device at a low power corresponding to a predetermined range of communication less than a full communication range of the wireless device such that the control device must be within the predetermined range to receive the setup request.

9. The method of claim 8, wherein said predetermined communication range is approximately one meter.

10. A method of using a hand held control device to set up a wireless electronic device to join a wireless local area network (LAN) comprising:
    receiving at the hand held control device a setup request from the wireless electronic device via a limited access connection, said setup request including a request to add the wireless electronic device to the wireless LAN;
    creating in the hand held device a data package including network information necessary for the wireless electronic device to join the wireless LAN via a full access wireless connection that is not provided via said hand held control device; and sending the data package from the hand held control device to the wireless electronic device.

11. The method of claim 10, wherein said receiving step comprises:
receiving information identifying the wireless LAN that the wireless electronic device is requesting to be added to, and
receiving information identifying the type of wireless device requesting to be added to the wireless LAN; and
said creating step comprises creating a data package including network protocol software operable on the wireless electronic device identified and compatible with the LAN identified.

12. The method of claim 10, wherein:
said receiving step comprises receiving information requesting optional network services for the wireless device; and
said sending step comprises sending network information necessary to obtain the optional network services of the wireless LAN.

13. The method of claim 12, wherein said optional network services include at least one of encryption and backup storage.

14. The method of claim 10, wherein said receiving a setup request comprises receiving a setup request from the wireless electronic device via a hard wired medium that provides limited access to the wireless access device.

15. The method of claim 10, wherein said receiving a setup request from the wireless electronic device comprises receiving a wireless setup request from the wireless electronic device via a wireless medium that provides limited access to the wireless access device.

16. The method of claim 15, wherein said receiving a setup request from the wireless electronic device comprises:
locating the control device within a predetermined range of communication less than a full communication range of the wireless electronic device; and
receiving a wireless setup request transmitted at a low power corresponding to said predetermined range of communication.

17. The method of claim 16, wherein said predetermined communication range is approximately one meter.

18. A wireless electronic device comprising:
a memory device having embodied therein, data related to setting up the wireless electronic device to join a wireless local area network (LAN); and
a processor in communication with said memory device, said processor configured to:
send a setup request to a hand held control device via a limited access connection, said setup request including a request to be added to the wireless LAN;
receive a data package from the hand held control device, the data package including network information necessary for the wireless device to join the wireless LAN; and
utilize the network information to establish a full access wireless connection to an access point of the wireless LAN, wherein said full access wireless connection is not provided via said hand held control device.

19. The wireless electronic device of claim 18, wherein said processor is configured to send a setup request by:
sending information identifying the wireless LAN that the wireless device is requesting to be added to; and
sending information identifying the type of wireless device requesting to be added to the wireless LAN.

20. The wireless electronic device of claim 19, wherein said processor is configured to receive a data package by receiving network protocol software operable on the wireless device identified and compatible with the LAN identified.

21. The wireless electronic device of claim 18, wherein:
said processor is configured to send a setup request by sending information requesting optional network services for the wireless device; and
said processor is configured to receive a data package by receiving network information necessary to obtain the optional network services of the wireless LAN.

22. The wireless electronic device of claim 18, wherein said processor is configured to send the setup request via a hard wired medium that limits access to the wireless access device.

23. The wireless electronic device of claim 18, wherein said processor is configured to send the setup request via a wireless medium that provides limited access to the wireless electronic device.

24. The wireless electronic device of claim 23, wherein said processor is configured to control the wireless transmit power of the wireless electronic device so as to send the wireless setup request to the control device at a low power corresponding to a predetermined range of communication less than a full communication range of the wireless device such that the control device must be within the predetermined range to receive the setup request.

25. The wireless electronic device of claim 24, wherein said predetermined communication range is approximately one meter.

26. A hand held control device comprising
a memory device having embodied therein, data related to using the hand held control device to set up a wireless electronic device to join a wireless local area network (LAN); and
a processor in communication with said memory device, said processor configured to:
receive a setup request from the wireless electronic device via a limited access connection, said setup request including a request to add the wireless electronic device to the wireless LAN;
create a data package including network information necessary for the wireless electronic device to join the wireless LAN via a full access connection that is not provided via said hand held control device; and
send the data package to the wireless electronic device.

27. The control device of claim 26, wherein said processor is configured to receive a setup request by:
receiving information identifying the wireless LAN that the wireless electronic device is requesting to be added to, and
receiving information identifying the type of wireless device requesting to be added to the wireless LAN; and
said processor is configured to create a data package by creating a data package including network protocol software operable on the wireless electronic device identified and compatible with the LAN identified.

28. The control device of claim 26, wherein:
said processor is configured to receive a setup request by receiving information requesting optional network services for the wireless device; and
said processor is configured to send a data package including information necessary to obtain the optional network services of the wireless LAN.

29. The control device of claim 26, wherein said processor is configured to send the setup request via a hard wired connection that provides limited access to the wireless access device.

30. The control device of claim 26, wherein said processor is configured to receive the setup request via a wireless connection that provides limited access to the wireless access device.

31. A wireless electronic device comprising:
  means for sending a setup request to a hand held control device via a limited access connection, said setup request including a request to be added to a wireless local area network (LAN);
  means for receiving a data package from the hand held control device, the data package including network information necessary for the wireless device to join the wireless LAN; and
  means for utilizing the network information at the wireless device to establish a full access wireless connection to an access point of the wireless LAN, wherein said full access wireless connection is not provided via said hand held control device.

32. A hand held control device used to set up a wireless electronic device to join a wireless local area network (LAN) comprising:
  means for receiving at the hand held control device a setup request from the wireless electronic device via a limited access connection, said setup request including a request to add the wireless electronic device to the wireless LAN;
  means for creating in the hand held control device a data package including network information necessary for the wireless electronic device to join the wireless LAN via a full access wireless access connection that is not provided via said hand held control device; and
  means for sending the data package from the hand held control device to the wireless electronic device.

33. The method of claim 1, wherein said sending setup request for the wireless electronic device comprises sending a setup request from at least one of an office equipment, an entertainment device, an appliance, or an environmental control device.

34. The method of claim 10, wherein said sending setup request for the wireless electronic device comprises sending a setup request from at least one of an office equipment, an entertainment device, an appliance, or an environmental control device.

35. The wireless electronic device of claim 18, wherein the wireless electronic device comprises at least one of an office equipment, an entertainment device, an appliance, and an environmental control device.

36. The method of claim 1, wherein the hand held control device is not part of the wireless LAN.

37. The method of claim 10, wherein the hand held control device is not part of the wireless LAN.

38. The wireless electronic device of claim 18, wherein the hand held control device is not part of the wireless LAN.

39. The hand held control device of claim 26, wherein the hand held control device is not part of said wireless LAN.

40. A computer readable storage medium containing program instructions for execution on a computer system, which when executed by the computer system, cause the computer system to perform the steps in the method recited in any one of claims 1–17, 33–34 and 36–37.

* * * * *